(12) United States Patent
Kaneko et al.

(10) Patent No.: US 9,523,794 B2
(45) Date of Patent: Dec. 20, 2016

(54) OPTICAL FILM OF CELLULOSE ESTER AND CELLULOSE ETHER FOR VERTICAL ALIGNMENT LIQUID CRYSTAL DISPLAYS

(71) Applicant: Konica Minolta, Inc., Tokyo (JP)

(72) Inventors: Yuki Kaneko, Tokyo (JP); Masumi Nishimura, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/772,271

(22) PCT Filed: Feb. 7, 2014

(86) PCT No.: PCT/JP2014/052955
§ 371 (c)(1),
(2) Date: Sep. 2, 2015

(87) PCT Pub. No.: WO2014/136529
PCT Pub. Date: Sep. 12, 2014

(65) Prior Publication Data
US 2016/0033684 A1    Feb. 4, 2016

(30) Foreign Application Priority Data
Mar. 7, 2013    (JP) .................................. 2013-045882

(51) Int. Cl.
*G02B 5/30*    (2006.01)
*G02B 1/08*    (2006.01)
(Continued)

(52) U.S. Cl.
CPC .. *G02B 1/08* (2013.01); *C08J 5/18* (2013.01); *C08L 1/00* (2013.01); *C08L 1/10* (2013.01);
(Continued)

(58) Field of Classification Search
CPC ....... G02B 5/30; G02B 5/3016; G02B 5/3025; G02B 5/3083; G02B 5/32; G02F 1/133528; G02F 1/13363; G02F 1/133634; G02F 2001/133635; G02F 2001/133638
(Continued)

(56) References Cited

U.S. PATENT DOCUMENTS

2009/0273837 A1*  11/2009  Kawai ..................... B29C 41/24
                                                                   359/489.2
2012/0222793 A1*  9/2012  McCreight ........... G02B 5/3083
                                                                   156/60

FOREIGN PATENT DOCUMENTS

JP    2004157300 A    6/2004
JP    2006106224 A    4/2006
(Continued)

OTHER PUBLICATIONS

International Preliminary Report on Patentability, total of 7 pages, Sep. 7, 2015.
(Continued)

*Primary Examiner* — Arnel C Lavarias
(74) *Attorney, Agent, or Firm* — Lucas & Mercanti, LLP

(57) ABSTRACT

The optical film contains cellulose ester and cellulose ether. The cellulose ester satisfies formulae $2.0 \leq X+Y \leq 3.0$ and $0 \leq Y \leq 1.6$. X is an acetyl group, and Y is a propionyl group and/or a butyryl group. The mass ratio of the cellulose ester to the cellulose ether is 99.0:1.0 to 55.0:45.0. Retardations Ro and Rt of the film are 20 to 130 nm and 100 to 300 nm, respectively, and expressed as $Ro=(nx-ny) \times d$ and $Rt=\{(nx+ny)/(2-nz)\} \times d$. nx is an in-plane refractive index of a film in a slow axis direction, ny is an in-plane refractive index of a film in a fast axis direction, nz is a refractive index of a film in a thickness direction, and d is a thickness of a film.

8 Claims, 2 Drawing Sheets

(51) Int. Cl.
  *C08J 5/18* (2006.01)
  *C08L 1/00* (2006.01)
  *C08L 1/10* (2006.01)
  *C08L 1/26* (2006.01)
  *C08L 101/12* (2006.01)
  *C08L 1/12* (2006.01)
  *C08L 1/14* (2006.01)
  *G02F 1/1335* (2006.01)
  *G02B 5/32* (2006.01)
  *C08K 5/151* (2006.01)

(52) U.S. Cl.
  CPC .. *C08L 1/12* (2013.01); *C08L 1/14* (2013.01); *C08L 1/26* (2013.01); *C08L 101/12* (2013.01); *G02B 5/305* (2013.01); *G02B 5/3083* (2013.01); *G02F 1/133528* (2013.01); *C08K 5/151* (2013.01); *G02B 5/3033* (2013.01); *G02B 5/32* (2013.01)

(58) Field of Classification Search
  USPC ............ 359/483.01, 489.01, 489.07, 491.01; 362/19; 353/20; 349/96, 117, 118, 119, 349/120, 121
  See application file for complete search history.

(56) References Cited

FOREIGN PATENT DOCUMENTS

| | | |
|---|---|---|
| JP | 2006297831 A | 11/2006 |
| JP | 2006330258 A | 12/2006 |
| JP | 2007052079 A | 3/2007 |
| JP | 2009288816 A | 12/2009 |
| JP | 2010249894 A | 11/2010 |
| JP | 2011017932 A | 1/2011 |
| JP | 2011056787 A | 3/2011 |
| JP | 2011112842 A | 6/2011 |
| JP | 5047784 B2 | 10/2012 |
| JP | 2013254043 A | 12/2013 |
| WO | 2013111670 A1 | 8/2013 |

OTHER PUBLICATIONS

Translation of the International Preliminary Report on Patent Ability; total of 8 pages, Sep. 7, 2015.
International Search Report dated Apr. 22, 2014 for PCT/JP2014/052955 and English translation.

* cited by examiner

OPTICAL FILM OF CELLULOSE ESTER AND CELLULOSE ETHER FOR VERTICAL ALIGNMENT LIQUID CRYSTAL DISPLAYS

CROSS REFERENCE TO RELATED APPLICATION

This Application is a 371 of PCT/JP2014/052955 filed on Feb. 7, 2014 which, in turn, claimed the priority of Japanese Patent Application No. JP2013-045882 filed on Mar. 7, 2013, both applications are incorporated herein by reference.

TECHNICAL FIELD

The present invention relates to an optical film, and a polarizing plate and a vertical alignment (VA) type liquid crystal display, which contain the optical film.

BACKGROUND ART

Demand of a liquid crystal display has been increased in the use for a liquid crystal television, a liquid crystal display of a personal computer, and the like. In general, a liquid crystal display is constituted of a liquid crystal cell that is obtained by sandwiching a transparent electrode, a liquid crystal layer, a color filter and the like by glass plates, and two polarizing plates arranged on both sides of the liquid crystal cell, and each of the polarizing plates has a constitution in which a polarizer (also referred to as a polarizing film) is sandwiched between two films (protective films for a polarizing plate).

As the liquid crystal display, some drive systems of a TN type (Twisted Nematic type), an IPS type (In-Plane Switching type), an OCB type (Optically Compensated Bend type), a VA type (Vertical Alignment type), and the like have been known. Among them, a VA type liquid crystal display can obtain an excellent viewing angle characteristic, and high contrast, therefore has been receiving attention in recent years. However, in a VA type liquid crystal display, there is a problem that the brightness change and color change due to viewing angle are large, caused by the arrangement method of the liquid crystal molecule, and the way of motion of the liquid crystal molecules at the time of application of voltage.

For this problem, it has been reported that the arrangement of an optically biaxial optical film between a polarizing plate and a liquid crystal layer of a liquid crystal display is effective. In Japanese Patent Application Laid-Open (JP-A) No. 2009-288816, an invention relating to a liquid crystal display in which an optical compensation sheet is bonded above and below the liquid crystal cell in VA mode, a polarizing film is arranged above and below the optical compensation sheet, and a protective film is arranged above and below the polarizing film is described. According to JP-A No. 2009-288816, it is described that an intended retardation value is achieved by using a cellulose-lower fatty acid ester film containing a predetermined compound as the optical compensation sheet (optical film), and application to a VA type liquid crystal display can suitably be performed.

By the way, as the optical film, various ones have been reported so far. For example, in Japanese Patent No. 5047784 (specification of U.S. Application Publication No. 2009/273837), a phase difference film (optical film) containing cellulose ester that has a predetermined structure and a predetermined molecular weight, and cellulose ester or cellulose ether that has a predetermined structure and a predetermined molecular weight, in an amount of 20 to 50% by weight, and in an amount of 80 to 50% by weight, respectively has been reported. According to Japanese Patent No. 5047784, it is described that the predetermined retardation, and the durability against the temperature change and the like are both satisfied by the inclusion of cellulose ester, and further predetermined cellulose ester or cellulose ether having a molecular weight different from that of the above-described cellulose ester. However, when the technique described in Japanese Patent No. 5047784 was checked, the film was easily torn during the production and transport of a film and during the cutting because of the low tear strength, and had a problem in the handleability.

SUMMARY OF INVENTION

As described in JP-A No. 2009-288816, by cellulose ester, an intended retardation value (in-plane phase difference Ro, and thickness direction phase difference Rt) can be achieved, therefore, an optical film containing the cellulose ester can suitably be used for the application of a VA type liquid crystal display.

However, for example, an optical film containing as a main component the cellulose ester described in JP-A No. 2009-288816 has high moisture permeability, therefore, the moisture is permeated into the inside, as a result of which fluctuation of the retardation value (phase difference value) of a phase difference film is easily caused. As a result, there was a problem that the color unevenness is generated in a VA type liquid crystal display.

On the other hand, by the application of the optical film described in Japanese Patent No. 5047784, the retardation value is hardly controlled to a retardation value (Ro: 20 to 130 nm, and Rt: 100 to 300 nm) capable of applying to a VA type liquid crystal display even if the Rt fluctuation due to humidity is tried to be improved. Further, a film is easily torn during the production and transport of the film and during the cutting, and a problem can be generated in the handleability.

Accordingly, an object of the present invention is to provide an optical film that can achieve an intended retardation value suitable for a VA type liquid crystal display while decreasing the Rt fluctuation due to humidity.

Further, an object of the present invention is to provide an optical film in which the tear strength has been improved.

As a result of the intensive study, the present inventors have found that the problems described above can be resolved by an optical film that contains as a main component cellulose ester having a specific structure, and further contains cellulose ether, and thus have completed the present invention.

That is, the above-described problems of the present invention can be achieved by the following means.

1. An optical film, containing cellulose ester and cellulose ether, in which the cellulose ester satisfies formulae (1), and (2):

[Mathematical formula 1]

$$2.0 \leq X+Y \leq 3.0 \tag{1}$$

$$0 \leq Y \leq 1.6 \tag{2}$$

(in which X is a substitution degree of an acetyl group, and Y is a substitution degree of a propionyl group and/or a butyryl group); a mixing ratio of the cellulose ester and the cellulose ether (cellulose ester:cellulose ether) is 99.0:1.0 to 55.0:45.0 (mass ratio); and retardations Ro, and retardation Rt expressed in formulae (3), and (4):

[Mathematical formula 2]

$$Ro=(nx-ny) \times d \quad (3)$$

$$Rt=\{(nx+ny)/(2-nz)\} \times d \quad (4)$$

(in which nx is an in-plane refractive index of a film in a slow axis direction, ny is an in-plane refractive index of a film in a fast axis direction, nz is a refractive index of a film in a thickness direction, and d is a thickness (nm) of a film), are 20 to 130 nm, and 100 to 300 nm, respectively;

2. The optical film according to 1, in which a mixing ratio of the cellulose ester and the cellulose ether (cellulose ester:cellulose ether) is 95.0:5.0 to 60.0:40.0 (mass ratio);

3. The optical film according to 1 or 2, in which the cellulose ester satisfies formula (5):

[Mathematical formula 3]

$$0 \leq Y \leq 0.9 \quad (5);$$

4. The optical film according to any one of 1 to 3, further containing 1.0 to 30.0 parts by mass of a plasticizer based on 100 parts by mass in total of cellulose ester and cellulose ether;

5. The optical film according to 4, in which the plasticizer is at least one selected from the group consisting of a carbohydrate derivative, a polyester compound, and a resin having a negative birefringence;

6. The optical film according to any one of 1 to 5, further containing a hydrogen bonded compound;

7. A polarizing plate, containing the optical film according to any one of 1 to 6, and a polarizer, in which the optical film and the polarizer are bonded by an active energy ray curable adhesive; and 8. A vertical alignment (VA) type liquid crystal display, in which the polarizing plate according to 7 is provided at least on one surface of a liquid crystal cell.

BRIEF DESCRIPTION OF DRAWINGS

In FIG. 1, 1 shows a dissolving kettle, 3, 6, 12, and 15 each shows a filter, 4, and 13 each shows a stock tank, 2, 5, 11, and 14 each shows a liquid feeding pump, 8, and 16 each shows a conduit, 10 shows an UV absorber feeding kettle, 20 shows a junction pipe, 21 shows a mixer, 30 shows a die, 31 shows a metal support, 32 shows a web, 33 shows a release position, 34 shows a tenter device, 35 shows a roller drying device, 36 shows a transporting roll, 37 shows a winding device, 41 shows a feeding kettle, 42 shows a stock kettle, 43 shows a pump, and 44 shows a filter.

DESCRIPTION OF EMBODIMENTS

Figure 1:
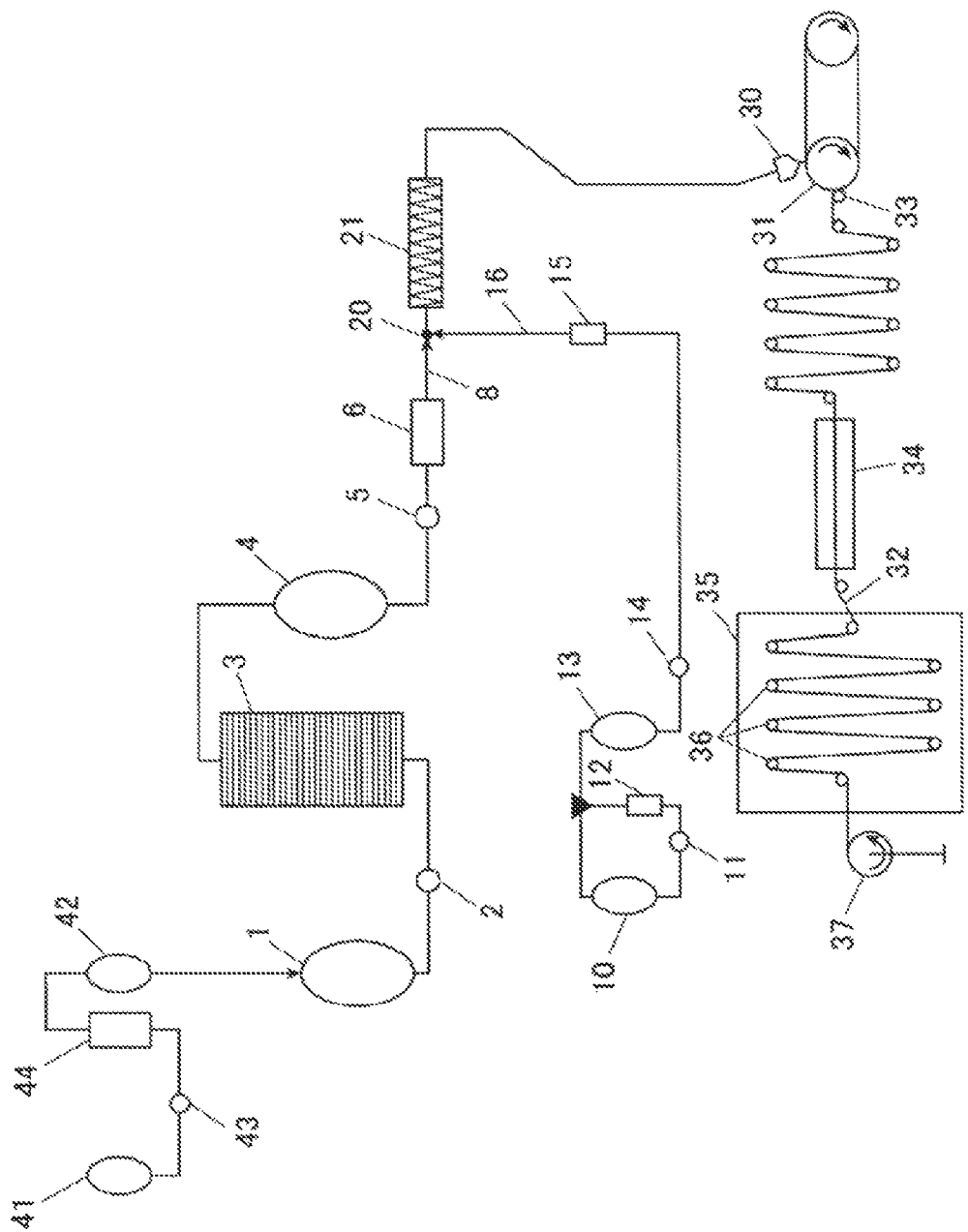
FIG. 1 is a schematic drawing of a film production apparatus according to one embodiment of the present invention (a dope preparation step, a casting step, and a drying step of a solution casting film forming method).

Hereinafter, the embodiment for carrying out the present invention will be described in detail.

According to one embodiment of the present invention, an optical film containing cellulose ester and cellulose ether is provided. At this moment, the cellulose ester satisfies the following formulae (1), and (2):

[Mathematical formula 4]

$$2.0 \leq X+Y \leq 3.0 \quad (1)$$

$$0 \leq Y \leq 1.6 \quad (2).$$

At this moment, in the above formulae, it is characterized in that X is a substitution degree of an acetyl group, and Y is a substitution degree of a propionyl group and/or a butyryl group.

Further, the optical film according to the present embodiment is characterized in that a mixing ratio of cellulose ester and cellulose ether (cellulose ester:cellulose ether) is 99.0:1.0 to 55.0:45.0 (mass ratio). Hereinafter, the present embodiment is also referred to as the first embodiment.

In addition, the optical film according to the present embodiment is characterized in that the retardation Ro is 20 to 130 nm, and the retardation Rt is 100 to 300 nm, retardations Ro and Rt are expressed in the following formulae (3) and (4):

[Mathematical formula 5]

$$Ro=(nx-ny) \times d \quad (3)$$

$$Rt=\{(nx+ny)/(2-nz)\} \times d \quad (4)$$

At this moment, in the above formulae, nx is an in-plane refractive index of a film in a slow axis direction, ny is an in-plane refractive index of a film in a fast axis direction, nz is a refractive index of a film in a thickness direction, and d is a thickness (nm) of a film.

According to the present embodiment, the Rt fluctuation due to humidity can be decreased in the optical film. Further, according to the present embodiment, an optical film in which the tear strength has been improved can be provided.

<Optical Film>

An optical film has an optical compensation function. Accordingly, in a case where an optical film is used for a liquid crystal display, a wide viewing angle, and the like can be achieved. Further, the "optical film" in the present specification means a film having a refractive index different from each other in the in-plane direction and in the thickness direction.

The optical film according to the present embodiment contains cellulose ester and cellulose ether. At this moment, a mixing ratio of the cellulose ester and the cellulose ether (cellulose ester:cellulose ether) is 99.0:1.0 to 55.0:45.0 (mass ratio); preferably 95.0:5.0 to 60.0:40.0 (mass ratio); and more preferably 90.0:10.0 to 65.0:35.0 (mass ratio). By containing a larger amount of cellulose ester than that of cellulose ether, the retardation value can suitably be controlled. Further, by setting the mixing ratio in the above-described range, the decrease of the Rt fluctuation due to humidity can be achieved, and further the improvement of the tear strength can be achieved.

In the optical film according to the present embodiment, the retardation Ro is 20 to 130 nm, and preferably 35 to 100 nm. Further, in the optical film according to the present invention, the retardation Rt is 100 to 300 nm, and preferably 100 to 250 nm. When having the above-described retardation value, the optical film can suitably be applied to a VA type liquid crystal display. The values of the retardation Rt and the retardation Ro can be adjusted by the control of the stretch ratio at the time of preparing a film, the kind, and content of the cellulose ester, cellulose ether and additives to be used, the thickness, and the like. Further, the retardations Ro and Rt can be determined by the above formulae (3) and (4), respectively. At this moment, in the present specification, as each value of the "retardations Rt and Ro", a value measured at a wavelength of 590 nm is employed, and as the retardation value, a value measured by using an automatic birefringence meter KOBRA-21ADH (manufactured by Oji Sceientific Instruments) is employed.

In the optical film, the Rt humidity fluctuation expressed in represented by the following formula (6):

[Mathematical formula 6]

$$Rt \text{ humidity fluctuation} = \{Rt_1 - Rt_2\}/Rt_3 \times 100 \quad (6)$$

is preferably 1 to 12%, more preferably 1 to 10%, and furthermore preferably 1 to 8%. The value of the Rt humidity fluctuation is an indicator showing the stability against the humidity fluctuation, the smaller this value is, the more stable against the humidity fluctuation the film shows. When the Rt humidity fluctuation is 1% or more, the moisture permeability of the optical film is not excessively decreased, and a protective film and a polarizer in a case where the optical film is applied to a polarizing plate can be prevented from the uneven distribution of water, therefore, this is preferred. On the other hand, when the Rt humidity fluctuation is 12% or less, the influence on humidity, and the like can suitably be decreased. The Rt humidity fluctuation can be adjusted by the control of the stretch ratio at the time of preparing a film, the kind, and content of the cellulose ester, cellulose ether and additives to be used, the thickness, and the like. Further, in the above formula, $Rt_1$ is the Rt after the film has been left to stand for 5 hours under the environments of 23° C. and 20% RH, $Rt_2$ is the Rt after the film has been left to stand for 5 hours under the environments of 23° C. and 80% RH, and $Rt_3$ is the Rt after the film has been left to stand for 5 hours under the environments of 23° C. and 55% RH. In addition, the $Rt_1$ to $Rt_3$ are the values determined respectively by the above-described formula (4).

The film thickness of the optical film is preferably 15 μm or more to less than 40 μm, more preferably 20 to 35 μm, and furthermore preferably 25 to 30 μm. When the film thickness of the optical film is 15 μm or more, the uniform film forming becomes possible, and even in a case of a large area, the generation of display unevenness can be prevented, therefore, this is preferred. On the other hand, when the film thickness of the optical film is less than 40 μm, the absolute amount of the water content to be absorbed can be decreased, and the generation of display unevenness can be prevented, therefore, this is preferred.

In addition, each of the variations of the film thickness in a width direction and a length direction of the optical film is preferably 4 μm or less, more preferably 0 to 2.5 μm, and furthermore preferably 0 to 1.5 μm. When the variation of the film thickness is 4 μm or less, even in a case of a film with a large area, variations of the phase difference in a film plane are suppressed, and the generation of display unevenness can be prevented, therefore, this is preferred.

Further, the film thickness of the optical film is an average value of the values obtained by the measurement of the film thickness in 100 points at 10 mm intervals in a width direction of the film by a micrometer. In addition, the variation of the film thickness of the optical film is a difference between the maximum value and the minimum value of the measurement values.

The haze value of the optical film is preferably 1.0% or less, and more preferably 0.5% or less. When the haze value is 1.0% or less, sufficient brightness, and high contrast can be obtained even in a bright place, therefore, this is preferred. However, in a case where the optical film is used as a scattering film, the haze value may be a value exceeding the above value. As the haze value, a value obtained by the measurement using a hazemeter is employed.

The total light transmittance of the optical film is preferably 90% or more, and more preferably 93% or more. Further, the upper limit value is not particularly limited, however, is substantially around 99%. As the haze value, a value obtained by the measurement using a hazemeter is employed The L* of water-immersed part/L* of non-immersed part of the optical film is preferably 1.05 to 1.80, more preferably 1.05 to 1.55, and furthermore preferably 1.05 to 1.30. When the L* of water-immersed part/L* of non-immersed part is in the above range, the optical film has high water resistance, and the generation of display unevenness can be prevented even in a case of an optical film with a large area, therefore, this is preferred. In addition, the "L*" is a measurement value of lightness, and the "L* of water-immersed part/L* of non-immersed part" can be used as an indicator of the display unevenness in a case of a liquid crystal display. The value of the L* of water-immersed part/L* of non-immersed part is measured by the following method. That is, by using a liquid crystal display KDL 40EX720 (manufactured by Sony Corporation), a polarizing plate on the front side is released, and a polarizing plate for evaluation that has been constituted by using the optical film of the present embodiment is bonded by a substrate-less double-sided tape. Next, a liquid crystal display is laid and placed on a pedestal and the like, and then BEMCOT (manufactured by Asahi Kasei Corporation) is placed on a part of the polarizing plate for evaluation, and soaked in water. BEMCOT is covered with 100 μm PET so as not to be dried, signals of black display are input from a PC to a television, and the television is left for 24 hours in the power-on state (at a room temperature of 23° C., and a panel temperature of 38° C.). After 24 hours, BEMCOT is removed. The L* of the part where the BEMCOT has been placed is measured as L* of the water-immersed part by EZContrast (manufactured by ELDIM). The L* of the part where the BEMCOT has not been placed is measured as L* of the non-immersed part by EZContrast. Further, the measurement by EZContrast is performed in a color mode while the television is in the black display. The water immersion is performed by being left for 24 hours under the water immersion conditions of the power-on state of the panel, and the sticking state of the BEMCOT sufficiently soaked in water.

[Cellulose Ester]

The cellulose ester is the one in which at least one of the hydrogen atoms in hydroxyl groups is substituted by an acyl group at positions C2, C3, and C6 of the cellulose.

In the cellulose ester according to the present embodiment, the acyl group is preferably an acetyl group, a propionyl group, or a butyryl group. At this moment, the cellulose ester has at least one acetyl group. The cellulose ester may not contain either a propionyl group, or a butyryl group, may contain either one of a propionyl group, and a butyryl group, or may contain both of a propionyl group, and a butyryl group.

Therefore, specific examples of the cellulose ester include cellulose acetate (DAC, TAC), cellulose acetate propionate (CAP), cellulose acetate butyrate, and cellulose acetate propionate butyrate.

The total substitution degree of the cellulose ester according to the present embodiment (substitution degree of all the acyl groups that the cellulose ester has) satisfies the above formula (1). That is, the substitution degree by an acetyl group, a propionyl group, and a butyryl group of the cellulose ester (preferably, the total substitution degree of the cellulose ester) is 2.0 to 3.0, preferably 2.0 to 2.4 for the Rt humidity fluctuation, and preferably 2.4 to 3.0 for the tear tolerance.

Further, the substitution degree of a propionyl group and/or a butyryl group of the cellulose ester according to the present embodiment satisfies the above formula (2), and preferably satisfies the following formula (5):

[Mathematical formula 7]

$$0 \leq Y \leq 0.9 \quad (5)$$

When the substitution degree satisfies the formula (5), the Rt change of the optical film due to humidity can further be decreased, and further, the tear strength becomes high.

Further, the "total substitution degree" in the present specification indicates the average number of the degree of substitution of the hydroxyl groups per constituent unit (cellulose unit) of cellulose ester, and is calculated by the following formula (7).

[Mathematical formula 8]

Total substitution degree=3−(the number of the hydroxyl groups per constituent unit of cellulose) (7)

As a specific example, in a case where the hydroxyl groups at positions C2, C3, and C6 are all substituted by acyl groups, the total substitution degree (the maximum value) is 3.0. The acyl group of cellulose ester may averagely be substituted at positions C2, C3, and C6 per constituent unit of cellulose, or may be substituted with the distribution thereof. Further, as the value of "total substitution degree" or "substitution degree", a value obtained by the measurement by a method prescribed in ASTM-D817-96 (2010) is employed, unless otherwise indicated.

The number average molecular weight (Mn) of cellulose ether is preferably $5 \times 10^4$ to $3 \times 10^5$, and more preferably $7 \times 10^4$ to $2 \times 10^5$. When the number average molecular weight of cellulose ether is in the above range, the mechanical strength of a film to be obtained becomes high, therefore, this is preferred. Further, in the present specification, as the value of the "number average molecular weight (Mn)", a value calculated by a measurement using gel permeation chromatography (GPC) under the following measurement conditions is employed.

[Chemical Formula 1]
Solvent: methylene chloride
Column: Shodex K806, K805, and K803G (manufactured by SHOWA DENKO K.K.), are used by connecting three of the columns.
Column temperature: 25° C.
Sample concentration: 0.1% by mass Detector: RI Model 504 (manufactured by GL Science Ltd.)
Pump: L6000 (manufactured by Hitachi, Ltd.)
Flow rate: 1.0 mL/min
Calibration curve: using a calibration curve by 13 samples of Standard polystyrene STK standard polystyrene (manufactured by TOSOH CORPORATION), Mw=1000000 to 500. These 13 samples are used at approximately equal intervals.

The above-described cellulose ester may be used alone, or as a mixture of two or more kinds thereof.

By using the above-described specific cellulose ester together with the cellulose ether described later, the optical film to be obtained has water resistance, and further can exhibit an intended retardation value suitable for the application to a VA type liquid crystal display.

As the cellulose ester, a self-prepared cellulose ester may be used, or a product available on the market may be used.

The self-preparation method for cellulose ester is not particularly limited, however, a method for acylating cellulose by a chemical technique is mentioned. At this moment, the method for esterification (acylation) is not particularly limited, and as the method, a known method can be used.

For example, a method in which cellulose is added into water or an appropriate solvent so as to be dispersed or dissolved, subsequently into which a carboxylic acid halide, a carboxylic acid anhydride, carboxylic acid, or aldehyde is added, and the resultant mixture is reacted under appropriate reaction conditions is mentioned.

In this case, a reaction catalyst may be added as needed. Examples of the reaction catalyst include, for example, a basic catalyst of pyridine, N,N-dimethylaminopyridine, triethylamine, sodium methoxide, sodium ethoxide, sodium hydroxide, or the like; and an acid catalyst of acetic acid, sulfuric acid, perchloric acid, or the like. Among them, from the viewpoint of preventing the decrease of the reaction rate, and polymerization degree, a basic catalyst of pyridine, or the like is preferably used.

The reaction temperature is preferably 40 to 100° C. By setting the reaction temperature in the range described above, the reaction rate can be ensured.

The reaction time can appropriately be set depending on the kind, addition amount, or the like of a reagent to be used.

The position at which an acyl group is introduced is not particularly limited, and can appropriately be controlled by the kind, or equivalent of a raw material, the reaction temperature, the reaction time, or the like. Further, a protecting group may be used as needed.

The product available on the market is not particularly limited, however, examples of which include L20, L30, L40, and L50 (manufactured by Daicel Corporation, cellulose acetate having a substitution degree of 2.4); LT-35, LT-55, and LT-105 (manufactured by Daicel Corporation, cellulose acetate having a substitution degree of 2.9); and Ca398-3, Ca398-6, Ca398-10, Ca398-30, and Ca394-60S (manufactured by Eastman Chemical Company).

[Cellulose Ether]
The cellulose ether used in the present embodiment is preferably the one in which a hydroxyl group of cellulose is substituted by an alkoxyl group having 4 or less carbon atoms. Specifically, the hydroxyl group of cellulose is substituted by any one of a methoxyl group, an ethoxyl group, a propoxyl group, and a butoxyl group, or multiple alkoxyl groups. In particular, cellulose ether in which the hydroxyl group of cellulose is substituted by one of a methoxyl group or an ethoxyl group alone, or multiple alkoxyl groups is preferred. Among them, ethyl cellulose that satisfies the ethoxyl substitution degree of 2.0 to 2.8 can suitably be used.

The ethoxyl substitution degree denotes how many three hydroxyl groups, which present at positions 2, 3, and 6 in a cellulose molecule, have been ethoxylated on average, and when the substitution degree is 3, it denotes that all of the hydroxyl groups have been ethoxylated. The substitution degree may be equal at each position, or may be biased at any position. Further, the ether substitution degree can be quantified by a method described in ASTM D4794-94.

It has been known that the solubility of ethyl cellulose into a solvent largely varies depending on the substitution degree. In a case where a film of the present invention is formed by a solvent cast method, a solvent that dissolves both of ethyl cellulose and the above-described cellulose ester is required to be selected. When the substitution degree is 2.0 or more, the kind of a solvent used alone for dissolving is not limited, the water absorption of a film is decreased, and there is a tendency that the dimensional stability is excellent. Further, when the substitution degree is 2.8 or less, the kind of a solvent used for dissolving is not limited, and there is a tendency that the resin itself is inexpensive. Therefore, the range of ethoxyl substitution degree is preferably 2.0 or more to 2.8 or less, and more preferably 2.2 or more to 2.6 or less.

Cellulose ether itself can be produced by a known method. For example, cellulose ether is produced by the treatment of cellulose with a strong caustic soda solution to obtain an alkali cellulose, and by the etherification with the reaction of the alkali cellulose with methyl chloride, or ethyl chloride.

The number average molecular weight of cellulose ether is preferably 22000 to 100000, more preferably 30000 to 80000, and furthermore preferably 35000 to 65000. When the number average molecular weight is 100000 or less, the solubility favorable for a solvent is obtained, in addition to which, the obtained solution has suitable viscosity, and becomes suitable for a solvent cast method, and further the thermoforming is easily performed, and the transparency of a film can be improved. On the other hand, when the number average molecular weight is 22000 or more, there is a tendency that the mechanical strength of the obtained film is improved.

The optical film according to the present embodiment is characterized in that cellulose ester having a specific structure, and cellulose ether are mixed in a predetermined content. Accordingly, excellent water resistance, and an intended retardation value can be achieved, and a VA type liquid crystal display can suitably be used. Further, an optical film in which the tear strength has been improved can be obtained.

An optical film constituted of conventional cellulose ester achieves an intended phase difference, for example, a phase difference suitable for a VA type liquid crystal display by the appropriate changing of the substitution degree of an acyl group. However, cellulose ester originally has high moisture permeability, therefore, the phase difference fluctuates under the influence of humidity and the like. In addition, this fluctuation of the phase difference is frequently unevenly generated in a film, and thus may cause display unevenness.

As a technique to avoid the influence of the humidity, a method for decreasing the substitution degree of a substituent of cellulose ester is mentioned. When the number of acyl groups in cellulose ester is decreased, in the cellulose ester, the number of the carbonyl groups capable of coordinating a water molecule is decreased, therefore, it becomes possible that the influence of humidity is hardly received. Further, the carbonyl group contained in an acyl group of cellulose ester has a nature oriented in a direction perpendicular to the stretching direction of a film, therefore, by the decrease of the substitution degree of an acyl group in cellulose ester, high phase difference can also be achieved. That is, the substitution degree of cellulose ester can have a function in which a certain degree of water resistance is imparted, and the phase difference is adjusted can be provided.

As described above, in a case where a substitution degree of cellulose ester, and multiple substituents are provided, by the appropriate changing of a substitution degree of each of the substituents, the water resistance and the retardation value can be controlled. However, even in the cellulose ester designed in this way, by the moisture permeability that is possessed by cellulose ester itself, sufficient water resistance may not necessarily be obtained.

Accordingly, as described in Japanese Patent No. 5047784, for the purpose of imparting water resistance, a technique of mixing another cellulose derivative, for example, another cellulose ester, or cellulose ether, together with cellulose ester, is considered.

However, even if simply two kinds of celluloses are mixed, as described above, according to the moisture permeability possessed by cellulose ester itself, high water resistance is not necessarily obtained.

Further, in a case where cellulose ether and cellulose ester are simply mixed, there is a tendency that the phase difference becomes excessively high, and there may be a case where the application to a VA type liquid crystal display cannot be performed. Specifically, cellulose ether does not have a carbonyl group capable of coordinating a water molecule, therefore, can have higher water resistance as compared with cellulose ester. However, cellulose ether is not oriented or is hardly oriented in a different direction from the stretching direction of a film, as compared with cellulose ester. Therefore, there is no, or almost no phase difference adjustment function by a substituent, and there may be a case where the phase difference is excessively high. As a result, for the purpose of imparting water resistance, even if an optical film is formed by the mixture of cellulose ester and cellulose ether, the phase difference suitable for a VA type liquid crystal display cannot be obtained.

In addition, in a case where cellulose ester and cellulose ether are mixed, the tear strength is sometimes lowered. As a result, the obtained optical film is easily torn during the production and transport of a film, and during the cutting, therefore, there may be a case where a problem in the handleability is generated.

In the present embodiment, by the mixture of cellulose ester having a specific structure, and cellulose ether with a predetermined ratio, the phase difference suitable for a VA type liquid crystal display can be obtained while imparting water resistance. In more detail, in a case where the total substitution degree (X+Y in formula (1)) of cellulose ester, the kind of a substituent (an acetyl group, a propionyl group, or a butyryl group), and multiple substituents are provided, the substitution degree (Y in formula (1)) is controlled, and further, by the mixture of cellulose ester and a predetermined amount of cellulose ether together with the cellulose ester having the specific structure, the above-described effect of the present invention can be achieved.

[Additive]

Into the optical film according to the present embodiment, various additives may appropriately be contained as needed. The additive is not particularly limited, however, examples of which include a plasticizer, a hydrogen bonded compound, an UV absorber, a mat agent, acrylic particles, and an ionic surfactant.

(Plasticizer)

A plasticizer has a function in which performance of flexibility, water resistance, and the like is imparted to an optical film, and further has a function in which a melting temperature, and a viscosity are lowered. Accordingly, an optical film can be produced with high productivity.

The plasticizer that can be used is not particularly limited, however, examples of which include a carbohydrate derivative, a polyester compound, and a resin having a negative birefringence.

Carbohydrate Derivative

A carbohydrate derivative has a function as a plasticizer, and further has a function of preventing hydrolysis of cellulose ester.

The carbohydrate derivative is not particularly limited, however, examples of which include a sugar ester compound.

As the sugar ester compound, a sugar ester compound which has 1 to 12 structures of at least one of pyranose structures or furanose structures, and in which all or part of the hydroxyl groups having the structure is esterified is mentioned.

Specifically, as the sugar ester compound, a compound obtained by the reaction of sugar of a synthetic raw material, or sugar that is synthesized by using the sugar of a synthetic raw material and has 1 to 12 structures of at least one of pyranose structures or furanose structures, with monocarboxylic acid is mentioned.

The sugar of a synthetic raw material is not particularly limited, however, examples of which include glucose, galactose, mannose, fructose, xylose, arabinose, lactose, sucrose, nystose, 1F-fractcylnystose, stachyose, maltitol, lactitol, lactulose, cellobiose, maltose, cellotriose, maltotriose, raffinose, kestose, gentiobiose, gentiotriose, gentiotetraose, xylotriose, and galactocylsucrose.

The monocarboxylic acid is not particularly limited, and a known aliphatic monocarboxylic acid, alicyclic monocarboxylic acid, aromatic monocarboxylic acid, or the like may be used. The carboxylic acid may be used singly, or as a mixture of two or more kinds thereof.

Examples of the preferred aliphatic monocarboxylic acid include a saturated fatty acid such as acetic acid, propionic acid, butylic acid, iso-butylic acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanoic acid, melissic acid, and lacceric acid, and an unsaturated fatty acid such as undecenoic acid, oleic acid, sorbic acid, linoleic acid, linolenic acid, arachidonic acid, and octenoic acid.

Examples of the preferred alicyclic monocarboxylic acid include cyclopentane carboxylic acid, cyclohexane carboxylic acid, cyclooctane carboxylic acid, or a derivative thereof.

Examples of the preferred aromatic monocarboxylic acid include a benzoic acid, an aromatic monocarboxylic acid introduced 1 to 5 alkyl groups or alkoxy groups in a benzene ring of a benzoic acid, such as phenylacetic acid, and toluic acid, an aromatic monocarboxylic acid having two or more benzene rings, such as cinnamic acid, benzilic acid, biphenylcarboxylic acid, naphthalenecarboxylic acid, and tetralincarboxylic acid, or a derivative thereof. However, particularly a benzoic acid is preferred.

Among the above-described sugar ester compounds, a sugar ester compound represented by the following general formula (FA) is preferably used.

[Chemical formula 2]

General formula (FA)

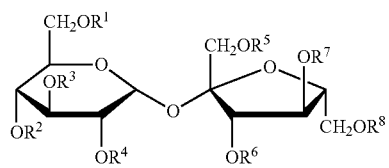

In the above formula, $R^1$ to $R^8$, each independently represents a hydrogen atom, a substituted or unsubstituted alkylcarbonyl group, or a substituted or unsubstituted arylcarbonyl group, and $R^1$ to $R^8$ may be the same as or different from each other (hereinafter, $R^1$ to $R^8$ are also referred to as an acyl group). As a specific example of $R^1$ to $R^8$, an acyl group derived from the monocarboxylic acid used in the synthesis of the sugar ester compound shown in the above is mentioned.

Hereinafter, a specific example of $R^1$ to $R^8$ of the sugar ester compound represented by the general formula (FA) is mentioned, however, is not limited to those. Further, R shown in the following represents any R of any $R^1$ to $R^8$.

[Chemical Formula 3]

| Compound number | R | Average substitution degree |
|---|---|---|
| FA-1 | —C(=O)—CH₃ | 4.2 |
| FA-2 | —C(=O)—CH₃ | 5.5 |
| FA-3 | —C(=O)—CH₃ | 6.0 |
| FA-4 | —C(=O)—CH₃ | 7.5 |
| FA-5 | —C(=O)—C₆H₅ | 4.0 |
| FA-6 | —C(=O)—C₆H₅ | 5.5 |
| FA-7 | —C(=O)—C₆H₅ | 6.5 |
| FA-8 | —C(=O)—C₆H₅ | 7.3 |

[Chemical Formula 4]

| Compound number | R | Average substitution degree |
|---|---|---|
| FA-13 | —C(=O)—CH₂—C₆H₅ | 3.0 |
| FA-14 | —C(=O)—CH₂—C₆H₅ | 4.0 |

-continued

| Compound number | R | Average substitution degree |
|---|---|---|
| FA-15 | —C(=O)—CH₂—C₆H₅ | 5.5 |
| FA-16 | —C(=O)—CH₂—C₆H₅ | 6.0 |
| FA-17 | —C(=O)—C₆H₂(OCH₃)₃ | 3.1 |
| FA-18 | —C(=O)—C₆H₂(OCH₃)₃ | 4.7 |
| FA-19 | —C(=O)—C₆H₂(OCH₃)₃ | 5.3 |
| FA-20 | —C(=O)—C₆H₂(OCH₃)₃ | 6.0 |

[Chemical Formula 5]

| Compound number | R | Average substitution degree |
|---|---|---|
| FA-21 | —C(=O)—CH(CH₃)CH₃ | 3.5 |
| FA-22 | —C(=O)—CH(CH₃)CH₃ | 4.6 |
| FA-23 | —C(=O)—CH(CH₃)CH₃ | 5.6 |
| FA-24 | —C(=O)—CH(CH₃)CH₃ | 6.0 |

[Chemical Formula 6]

| Compound number | R | Average substitution degree |
|---|---|---|
| FA-25 | —C(=O)—C₆H₄—CH₃ | 7.0 |
| FA-26 | —C(=O)—CH₂—C₆H₅ | 7.0 |
| FA-27 | —C(=O)—C₆H₂(OCH₃)₃ | 7.0 |
| FA-28 | —C(=O)—CH(CH₃)CH₃ | 7.0 |

The sugar ester compound represented by the general formula (FA) preferably has an average substitution degree of 3.0 to 6.0. When the average substitution degree of a sugar ester compound is in the range described above, the control of the moisture permeability, and the compatibility of cellulose ester and cellulose ether can both highly be satisfied.

In the present embodiment, the "substitution degree of the sugar ester compound represented by the general formula (FA)" means the number of Rs substituted by a substituent other than hydrogen, among the eight Rs ($R^1$ to $R^8$) contained in the general formula (FA). Therefore, in a case where all of the $R^1$ to $R^8$ are substituted by a substituent other than hydrogen, the average substitution degree is 8.0 (the maximum value). On the other hand, in a case where all of the $R^1$ to $R^8$ are substituted by a hydrogen atom, the average substitution degree is 0.0 (the minimum value).

The sugar ester compound represented by the general formula (FA) is difficult to synthesize a single kind of compound in which the number of hydroxyl groups, and the number of OR groups are fixed, and a compound in which a component having the different number of hydroxyl groups and the different OR groups in the formula is mixed in several kinds thereof has been known. Therefore, as an average substitution degree of the general formula (FA), an average substitution degree is appropriately used, and by a conventional method, an average substitution degree can be measured from the area ratio of a chart showing a substitution degree distribution by high performance liquid chromatography/mass spectrometry (HPLC/MS). Further, the HPLC/MS is performed under the following measurement conditions

[Chemical Formula 7]
(1) HPLC Section
  Apparatus: column oven (JASCO CO-965), detector (JASCO UV-970-240 nm), pump (JASCO PU-980), degasser (JASCO DG-980-50) (manufactured by JASCO Corporation)
  Column: Inertsil ODS-3 (particle diameter: 5 μm, 4.6×250 mm, manufactured by GL Sciences Inc.)
  Column temperature: 40° C.
  Flow rate: 1 mL/min
  Mobile phase: THF (1% acetic acid):H$_2$O (50:50)
  Injection volume: 3 μL
(2) MS Section
  Apparatus: LCQ DECA (manufactured by Thermo Quest Corporation)
  Ionization method: Electro spray ionization (ESI) method
  Spray Voltage: 5 kV
  Capillary temperature: 180° C.
  Vaporizer temperature: 450° C.

The sugar ester compound according to the present embodiment can be prepared by the reaction of the sugar with an acylating agent of an acid halide such as acetyl chloride, an acid anhydride such as an acetic anhydride, and the like. At this moment, the distribution of the substitution degree of the sugar ester compound can be adjusted by the appropriate control of the amount of an acylating agent, the addition timing, the reaction time, and the like. Further, a sugar ester having an intended average substitution degree can be prepared by the mixture of a sugar ester compound having a different substitution degree, or by the appropriate mixture of a purely isolated sugar ester compound having a different substitution degree.

Polyester Compound

The polyester compound is not particularly limited, however, a polyester compound expressed in the following general formula (FB-1) is preferably used.

[Chemical formula 8]

General formula (FB-1)

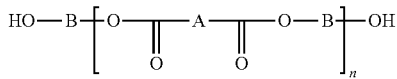

In the above formula, B represents a straight chain or branched chain alkylene group or cycloalkylene group having 2 or more to 6 or less carbon atoms, A represents an aromatic ring having 6 or more to 14 or less carbon atoms, and n represents a natural number of 1 or more.

The compound represented by the above-described formula is obtained from a dicarboxylic acid having an aromatic ring (also referred to as "aromatic dicarboxylic acid"), and a straight chain or branched chain alkylene or cycloalkylene diol having 2 or more to 6 or less carbon atoms; and characterized in that both ends are not sealed with a monocarboxylic acid.

Examples of the aromatic monocarboxylic acid having 8 or more to 16 or less carbon atoms include phthalic acid, isophthalic acid, terephthalic acid, 1,5-naphthalene dicarboxylic acid, 1,4-naphthalene dicarboxylic acid, 1,8-naphthalene dicarboxylic acid, 2,3-naphthalene dicarboxylic acid, 2,6-naphthalene dicarboxylic acid, 2,8-naphthalene dicarboxylic acid, 2,2'-biphenyl dicarboxylic acid, and 4,4'-biphenyl dicarboxylic acid. Among them, 2,6-naphthalene dicarboxylic acid, and 4,4'-biphenyl dicarboxylic acid are preferred.

Examples of the straight chain or branched chain alkylene or cycloalkylene diol having 2 or more to 6 or less carbon atoms include ethylene glycol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol, and 1,4-cyclohexanedimethanol. Among them, ethylene glycol, 1,2-propanediol, 1,3-propanediol, and 1,3-butanediol are preferred.

Among them, it is preferred that A is a naphthalene ring or a biphenyl ring, which may has a substituent, in order to obtain the effect of the present invention. Herein, the substituent is an alkyl group, an alkenyl group, or an alkoxyl group, which has 1 or more to 6 or less carbon atoms.

The hydroxyl value (OH value) of the polyester compound is preferably 100 mgKOH/g or more to 500 mgKOH/g or less, and more preferably 170 mgKOH/g to 400 mgKOH/g. When the hydroxyl value is in this range, the compatibility of cellulose ester and cellulose ether becomes suitable.

When the hydroxyl value is 400 mgKOH/g or less, the hydrophobic of a polyester compound is not extremely large, and when the hydroxyl value is 170 mgKOH/g or more, the intermolecular interaction (hydrogen bond, and the like) between polyester compounds is not excessively strong. This is considered because precipitation can be prevented in a film.

Further, the measurement of the hydroxyl value can be performed by the application of an acetic anhydride method and the like described in the Japanese Industrial Standards, JIS K1557-1: 2007.

The number average molecular weight (Mn) of the polyester compound is preferably 300 to 1500.

The number average molecular weight (Mn) of the polyester compound can be calculated by the following formula.

[Mathematical formula 9]

$$Mn = \text{(number of hydroxyl groups in a molecule)} \times 56110/\text{(hydroxyl value)} = 2 \times 56110/\text{(hydroxyl value)}$$

The polyester compound can easily be synthesized also by either one of a heat melting condensation method by a polyesterification reaction or ester exchange reaction of the dicarboxylic acid and diol according to a conventional method, or an interfacial condensation method of an acid chloride of these acids, and glycols.

Hereinafter, examples of the polyester compound are mentioned.

[Chemical Formula 9]

| | Aromatic dicarboxylic acid skeleton (A) | Diol skeleton (B) |
|---|---|---|
| PES-1 | 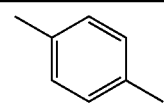 | 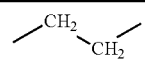 |

-continued

| | Aromatic dicarboxylic acid skeleton (A) | Diol skeleton (B) |
|---|---|---|
| PES-2 | (p-phenylene) | CH(CH₃)CH₃ (isopropylidene) |
| PES-3 | (p-phenylene) | (1,4-cyclohexylene) |
| PES-4 | (o-phenylene) | CH(CH₃)CH₂ |
| PES-5 | (2,6-naphthylene) | CH₂CH₂ |
| PES-6 | (2,6-naphthylene) | CH(CH₃)CH₂ / CH₂CH₂ (-75/+25) |
| PES-7 | (2,6-naphthylene) | CH₂CH₂CH₂ |

[Chemical Formula 10]

| | Aromatic dicarboxylic acid skeleton (A) | Diol skeleton (B) |
|---|---|---|
| PES-8 | (2,3-naphthylene) | (1,4-cyclohexylene) |
| PES-9 | (1,5-naphthylene) | C(CH₃)₃-C(CH₃)₃ |
| PES-10 | (4,4'-biphenylene) | CH(CH₃)CH₃ |
| PES-11 | (4,4'-biphenylene) | CH₂CH₃ |
| PES-12 | (4,4'-biphenylene) | CH(CH₃)CH(CH₃)CH(CH₃) |
| PES-13 | (tetramethylbiphenyl) | CH(CH₃)CH₃ |
| PES-14 | (tetramethylbiphenyl) | CH(CH₃)CH₃ |

Further, as another polyester compound, a polyester compound expressed in the following general formula (FB-2) is preferably used from the viewpoint of highly satisfying both of the control of moisture permeability and the compatibility with cellulose ester.

[Chemical Formula 11]

$$B\text{-}(G\text{-}A)n\text{-}G\text{-}B \qquad \text{General formula (FB-2)}$$

In the above formula, B represents a hydroxy group, or a carboxylic acid residue, G represents a straight chain, branched chain, or cyclic alkylene glycol residue having 2 to 18 carbon atoms, an aryl glycol residue having 6 to 12 carbon atoms, or an oxyalkylene glycol residue having 4 to 12 carbon atoms, A represents an alkylene dicarboxylic acid residue having 4 to 12 carbon atoms, or an aryl dicarboxylic acid residue having 6 to 12 carbon atoms, and n represents an integer of 1 or more.

In general formula (FB-2), a polyester compound is constituted of a hydroxy group, or a carboxylic acid residue, which is represented by B, an alkylene glycol residue, an oxyalkylene glycol residue, or an aryl glycol residue, which is represented by G, and an alkylene dicarboxylic acid residue, or an aryl dicarboxylic acid residue, which is represented by A, and is obtained by the same reaction as that of a usual ester-based compound.

As a component of a carboxylic acid of the polyester compound expressed in the general formula (FB-2), for example, there are acetic acid, propionic acid, butyric acid, benzoic acid, p-tertiary butylbenzoic acid, o-toluoylic acid, m-toluoylic acid, p-toluoylic acid, dimethylbenzoic acid, ethylbenzoic acid, n-propylbenzoic acid, aminobenzoic acid, acetoxybenzoic acid, and aliphatic acid. These may be used singly, or as a mixture of two or more kinds thereof.

As a component of a straight chain, branched chain, or cyclic alkylene glycol having 2 to 18 carbon atoms of the polyester compound expressed in the general formula (FB-2), there are ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexanediol, 1,4-cyclohexanedimethanol, cyclohexane diethanol, and the like. These glycols are used singly, or as a mixture of two or more kinds thereof.

In particular, alkylene glycol having 2 to 12 carbon atoms is particularly preferred because the compatibility with a cellulose ester resin is excellent. Alkylene glycol having 2 to 6 carbon atoms is more preferred, and alkylene glycol having 2 to 4 carbon atoms is furthermore preferred.

As an aryl glycol having 6 to 12 carbon atoms of the polyester compound expressed in the general formula (FB-2), for example, there are cyclic glycols such as 1,4-benzene dimethanol, and these glycols may be used singly, or as a mixture of two or more kinds thereof.

Further, As a component of an oxyalkylene glycol having 4 to 12 carbon atoms of the polyester compound expressed in the general formula (FB-2), for example, there are diethylene glycol, triethylene glycol, tetraethylene glycol, dipropylene glycol, and tripropylene glycol. These glycols may be used singly, or as a mixture of two or more kinds thereof.

As a component of an alkylene dicarboxylic acid having 4 to 12 carbon atoms of the polyester compound expressed in the general formula (FB-2), for example, there are succinic acid, maleic acid, fumaric acid, glutaric acid, adipic acid, azelaic acid, sebacic acid, and dodecane dicarboxylic acid. These are used singly, or as a mixture of two or more kinds thereof.

As a component of an aryl dicarboxylic acid having 6 to 12 carbon atoms of the polyester compound expressed in the general formula (FB-2), there are phthalic acid, terephthalic acid, isophthalic acid, 1,5-naphthalene dicarboxylic acid, and 1,4-naphthalene dicarboxylic acid.

In the polyester compound expressed in general formula (FB-2), the weight average molecular weight is suitably in the range of preferably 300 to 1500, and more preferably 400 to 1000. Further, the acid value is 0.5 mgKOH/g or less, and the hydroxy (hydroxyl) value is 25 mgKOH/g or less, and the acid value is more preferably 0.3 mgKOH/g or less, and the hydroxy (hydroxyl) value is 15 mgKOH/g or less.

The weight average molecular weight of a polyester compound is calculated by a measurement using gel permeation chromatography (GPC) under the following measurement conditions.

[Chemical formula 12]

Solvent: tetrahydrofuran (THF)
Column: TSKgel G2000HXL (manufactured by TOSOH CORPORATION, used by connecting two of the columns)
Column temperature: 40° C.
Sample concentration: 0.1% by mass
Apparatus: HLC-8220 (manufactured by TOSOH CORPORATION)
Flow rate: 1.0 mL/min
Calibration curve: using a calibration curve by PStQuick F (manufactured by TOSOH CORPORATION)

Hereinafter, a specific compound of the polyester compound expressed in general formula (FB-2), which can be used in the present embodiment, is shown, however, the present invention is not limited to those.

[Chemical formula 13]

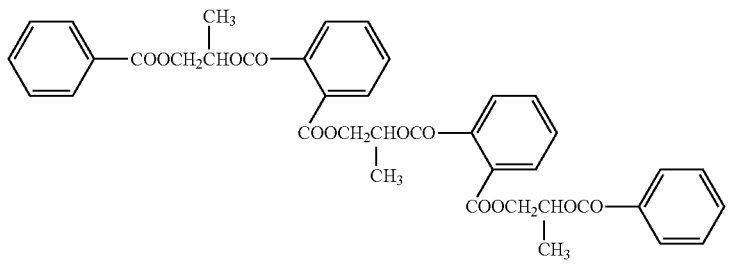

FB-1

Mw: 696

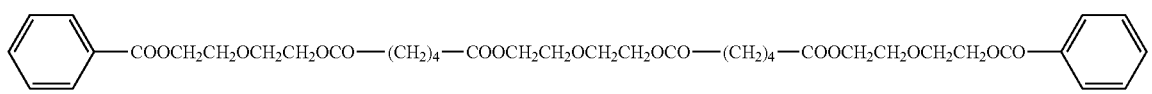

FB-2

Mw: 746

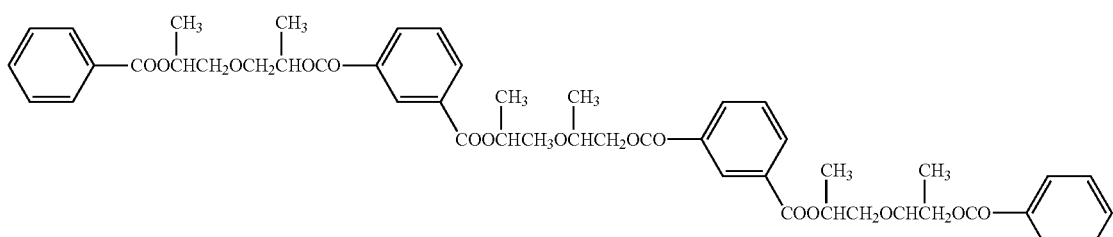

FB-3

Mw: 830

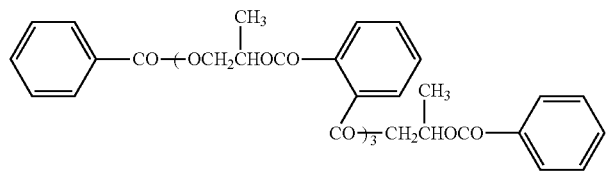
FB-4
Mw: 886
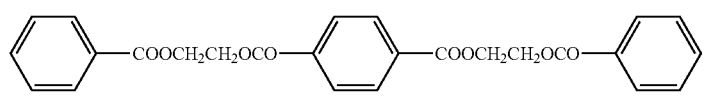
FB-5
Mw: 462
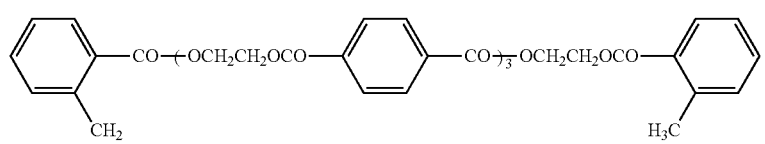
FB-6
Mw: 874
[Chemical formula 14]
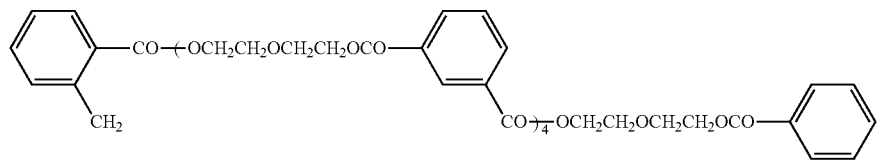
FB-7
Mw: 1258
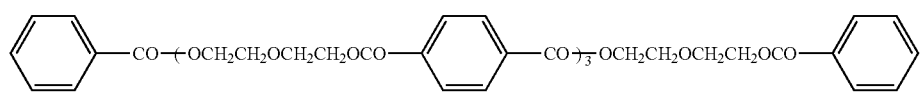
FB-8
Mw: 1494
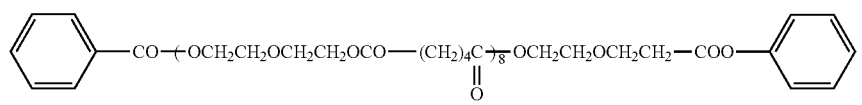
FB-9
Mw: 1394
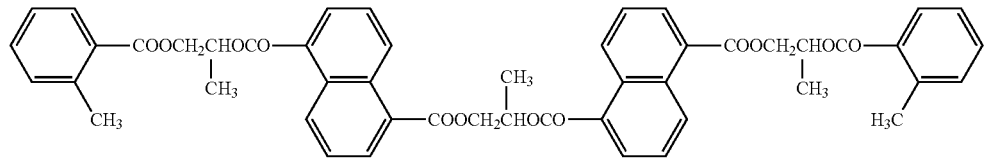
FB-10
Mw: 852
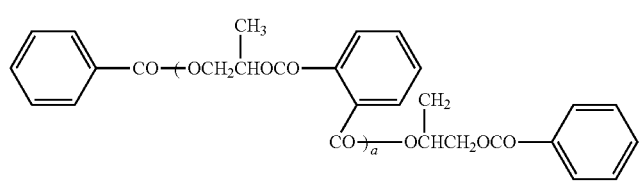
FB-11
Mw: 1314

-continued
FB-12
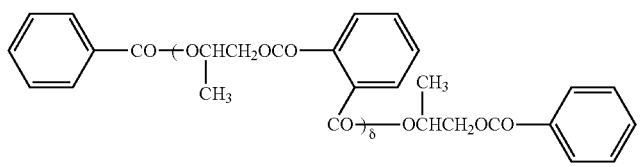
Mw: 1726
FB-13
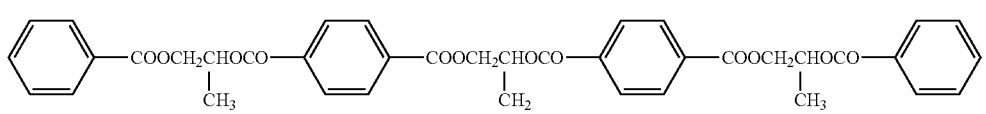
Mw: 696
[Chemical formula 15]
FB-14
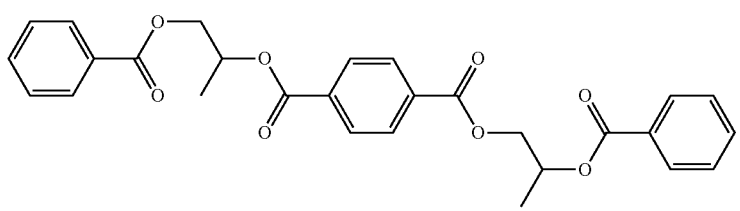
Mw: 491
FB-15
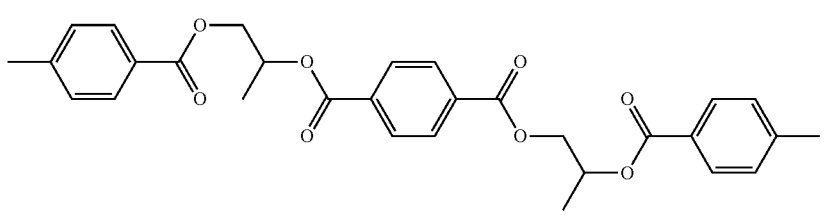
Mw: 519
FB-16
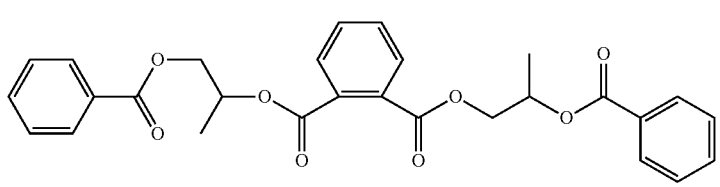
Mw: 491
FB-17
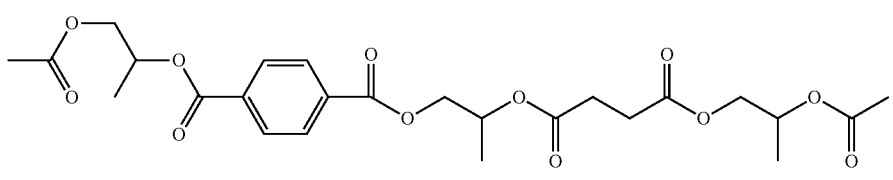
Mw: 525
FB-18
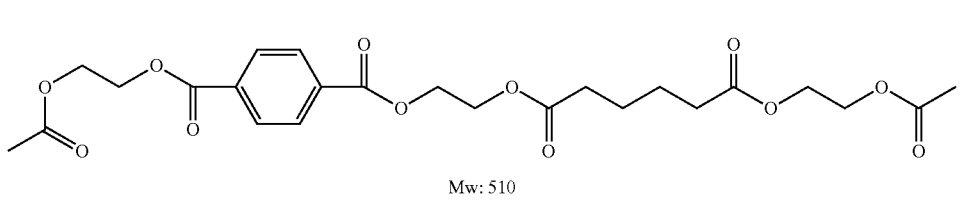
Mw: 510

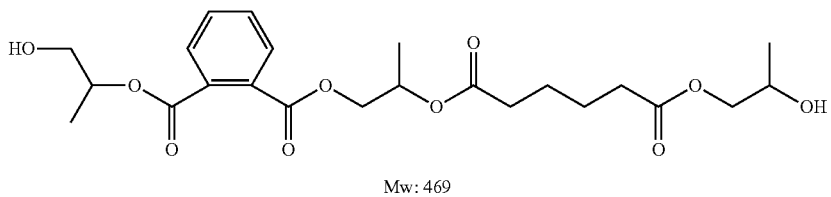

FB-19

Mw: 469

The film of the present embodiment contains a polyester compound in an amount of preferably 0.1 to 30% by mass, and particularly preferably 0.5 to 10% by mass based on the entire film (100% by mass).

Resin Having Negative Birefringence

A resin having a negative birefringence has a function as a plasticizer, and further has a function of imparting water resistance to an optical film.

The resin having a negative birefringence is not particularly limited, however, examples of which include an acrylic compound, and a styrene-based compound.

Examples of the acrylic compound include a polymer having a repeating unit derived from at least one acrylic monomer selected from the group consisting of (meth)acrylate, (meth)acrylic acid ester, (meth)acrylamides, and (meth)acrylonitrile. Among them, as an acrylic compound, a compound composed of a methyl methacrylate unit in an amount of 50 to 99% by mass, and other monomer units copolymerizable with the methyl methacrylate unit in an amount of 1 to 50% by mass in total, is preferred.

Examples of the copolymerizable other monomers include an alkyl methacrylate in which the number of carbon atoms of the alkyl group is 2 to 18; an alkyl acrylate in which the number of carbon atoms of the alkyl group is 1 to 18; a vinyl monomer having an amide group such as acryloyl morpholine, and N,N-dimethyl acrylamide; a methacrylic ester or acrylic ester that has an alicyclic hydrocarbon group having 5 to 22 carbon atoms in the ester moiety; an α- or β-unsaturated acid such as acrylic acid, and methacrylic acid; an unsaturated group-containing divalent carboxylic acid such as maleic acid, fumaric acid, and itaconic acid; an aromatic vinyl compound such as styrene, and α-methylstyrene; an α- or β-unsaturated nitrile such as acrylonitrile, and methacrylonitrile; maleic anhydride; maleimide; an N-substituted maleimide; and glutaric anhydride. These may be used alone, or as a mixture of two or more kinds thereof.

Further, the acrylic compound may have a ring structure. Specific examples of the acrylic compound include an acrylic compound having a lactone ring structure, a glutaric anhydride structure, a glutarimide structure, an N-substituted maleimide structure, a maleic anhydride structure, and a pyran ring structure. Among them, an acrylic compound having an N-substituted maleimide structure, or a pyran ring structure is preferred.

Among the above-described acrylic compounds, from the viewpoint of the heat decomposition resistance or the flowability of a copolymer, an acrylic compound containing as a monomer unit, an alkyl acrylate in which the number of carbon atoms of the alkyl group is 1 to 18, a vinyl monomer having an amide group, a methacrylic ester or acrylic ester that has an alicyclic hydrocarbon group having 5 to 22 carbon atoms in the ester moiety, or an N-substituted maleimide is preferred.

Specific examples of the alkyl acrylate in which the number of carbon atoms of the alkyl group is 1 to 18 include methyl acrylate, ethyl acrylate, n-propyl acrylate, n-butyl acrylate, s-butyl acrylate, and 2-etylhexyl acrylate. Among them, methyl acrylate is preferred.

Specific examples of the vinyl monomer having the amide group include acrylamide, N-methyl acrylamide, N-butyl acrylamide, N,N-dimethyl acrylamide, N,N-diethyl acrylamide, acryloyl morpholine, N-hydroxyethyl acrylamide, acryloyl pyrrolidine, acryloyl piperidine, methacrylamide, N-methyl methacrylamide, N-butyl methacrylamide, N,N-dimethyl methacrylamide, N,N-diethyl methacrylamide, methacryloyl morpholine, N-hydroxyethyl methacrylamide, methacryloyl pyrrolidine, methacryloyl piperidine, N-vinyl formamide, N-vinylacetamide, and vinylpyrrolidone. Among them, acryloyl morpholine, N,N-dimethyl acrylamide, N-butyl acrylamide, vinylpyrrolidone, and 2-hydroxyethyl methacrylate are preferred.

Specific examples of the methacrylic ester or acrylic ester that has an alicyclic hydrocarbon group having 5 to 22 carbon atoms in the ester moiety include cyclopentyl acrylate, cyclohexyl acrylate, methylcyclohexyl acrylate, trimethylcyclohexyl acrylate, norbornyl acrylate, norbornylmethyl acrylate, cyanonorbornyl acrylate, isobornyl acrylate, bornyl acrylate, menthyl acrylate, fenchyl acrylate, adamantyl acrylate, dimethyladamantyl acrylate, tricyclo[5.2.1.02,6]deca-8-yl acrylate, tricyclo[5.2.1.02,6]deca-4-methyl acrylate, cyclodecyl acrylate, cyclopentyl methacrylate, cyclohexyl methacrylate, methylcyclohexyl methacrylate, trimethylcyclohexyl methacrylate, norbornyl methacrylate, norbornylmethyl methacrylate, cyanonorbornyl methacrylate, phenylnorbornyl methacrylate, isobornyl methacrylate, bornyl methacrylate, menthyl methacrylate, fenchyl methacrylate, adamantyl methacrylate, dimethyladamantyl methacrylate, tricyclo[5.2.1.02,6]deca-8-yl methacrylate, tricyclo[5.2.1.02,6]deca-4-methyl methacrylate, cyclodecyl methacrylate, and dicyclopentanyl methacrylate. Among them, isobornyl methacrylate, dicyclopentanyl methacrylate, and dimethyladamantyl methacrylate are preferred.

Examples of the N-substituted maleimide include N-methylmaleimide, N-ethylmaleimide, N-propylmaleimide, N-i-propylmaleimide, N-butylmaleimide, N-i-butylmaleimide, N-t-butylmaleimide, N-laurylmaleimide, N-cyclohexylmaleimide, N-benzylmaleimide, N-phenylmaleimide, N-(2-chlorophenyl) maleimide, N-(4-chlorophenyl) maleimide, N-(4-bromophenyl) maleimide, N-(2-methylphenyl) maleimide, N-(2-ethylphenyl) maleimide, N-(2-methoxylphenyl) maleimide, N-(2,4,6-trimethylphenyl) phenylmaleimide, N-(4-benzylphenyl) maleimide, and N-(2,4,6-tribromophenyl) maleimide. Among them, N-methylmaleimide, N-cyclohexylmaleimide, and N-phenylmaleimide, are preferred.

As the acrylic compound containing the above-described monomer, a self-prepared acrylic compound may be used, or a product available on the market may be used. In a case where the acrylic compound is self-prepared, a known technique can appropriately be applied. For example, the acrylic compound may be prepared by any method of suspension polymerization, emulsion polymerization, bulk polymerization, solution polymerization, or the like. At this moment, a polymerization initiator such as a peroxide-based polymerization initiator, and an azo-based polymerization initiator, a chain transfer agent such as alkyl mercaptan, or the like may be used. Further, as the above-described monomer, a monomer available on the market can be used as it is.

The weight average molecular weight of an acrylic compound is, from the viewpoint of the control of the moisture permeability, and the compatibility with cellulose ester and cellulose ether, particularly 15000 or less, more preferably 10000 or less, and furthermore preferably 5000 to 10000. In addition, in the present specification, as a value of the "weight average molecular weight (Mw) of an acrylic compound", a value calculated by a measurement using gel permeation chromatography (GPC) under the following measurement conditions is employed.

[Chemical Formula 16]

Solvent: tetrahydrofuran

Column: TSKgel SuperHM-M (manufactured by TOSOH CORPORATION)

Column temperature: 40° C.

Sample concentration: 0.1% by mass

Apparatus: HLC-8220 (manufactured by TOSOH CORPORATION)

Flow rate: 0.6 mL/min

Calibration curve: using a calibration curve by 13 samples of Standard polystyrene STK standard polystyrene (manufactured by TOSOH CORPORATION), Mw=1000000 to 500. These 13 samples are used at approximately equal intervals.

Examples of the styrene-based compound include a homopolymer of a styrene-based monomer, and a copolymer of a styrene-based monomer and a copolymerizable monomer other than the styrene-based monomer. In a case where the styrene-based compound is the above-described copolymer, the content ratio of a constituent unit derived from a styrene-based monomer is preferably 30 to 100% by mole, and more preferably 50 to 100% by mole. If the content ratio of the constituent unit derived from a styrene-based monomer is in the range described above, the molecular structure has a certain level or more of bulkiness, therefore, this is preferred.

Among the above-described styrene-based compounds, a styrene-based compound in which a styrene-based monomer expressed in the following general formula (FC) is contained as a monomer unit is preferred.

[Chemical formula 17]

General formula (FC)

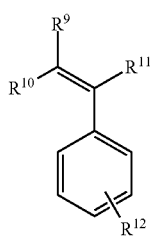

In the above formula, $R^9$ to $R^{11}$, each independently represents a hydrogen atom, an alkyl group having 1 to 30 carbon atoms, or an aryl group having 6 to 30 carbon atoms. Further, $R^{12}$ represents a hydrogen atom, an alkyl group having 1 to 30 carbon atoms, a cycloalkyl group having 3 to 30 carbon atoms, an aryl group having 6 to 30 carbon atoms, an alkoxy group having 1 to 30 carbon atoms, an aryloxy group having 6 to 30 carbon atoms, an alkyloxycarbonyl group having 2 to 30 carbon atoms, an aryloxycarbonyl group having 7 to 30 carbon atoms, an alkylcarbonyloxy group having 2 to 30 carbon atoms, an arylcarbonyloxy group having 7 to 30 carbon atoms, a hydroxyl group, a carboxyl group, a cyano group, an amino group, an amide group, and a nitro group. These groups, each may further have a substituent (for example, a hydroxyl group, a halogen atom, or an alkyl group). $R^{12}$s may be the same as or different from each other, and two or more of $R^{12}$s, which are adjacent to each other, may be bonded to each other to form a ring.

The styrene-based monomer is not particularly limited, however, specific examples of which include styrene; alkyl substituted styrenes such as α-methyl styrene, β-methyl styrene, and p-methyl styrene; halogen substituted styrenes such as 4-chlorostyrene, and 4-bromostyrene; hydroxystyrenes such as p-hydroxystyrene, a-methyl-p-hydroxystyrene, 2-methyl-4-hydroxystyrene, and 3,4-dihydroxystyrene; vinylbenzyl alcohols; alkoxy substituted styrenes such as p-methoxystyrene, p-tert-butoxystyrene, and m-tert-butoxystyrene; vinylbenzoic acids such as 3-vinylbenzoic acid, and 4-vinylbenzoic acid; 4-vinylbenzyl acetate; 4-acetoxystyrene; amide styrenes such as 2-butylamide styrene, 4-methylamide styrene, and p-sulfonamide styrene; aminostyrenes such as 3-aminostyrene, 4-aminostyrene, 2-isopropenyl aniline, and vinylbenzyldimethylamine; nitrostyrenes such as 3-nitrostyrene, and 4-nitrostyrene; cyanostyrenes such as 3-cyanostyrene, and 4-cyanostyrene; vinylphenylacetonitrile; aryl styrenes such as phenylstyrene; and indenes.

The above-described styrene-based monomer may be used alone, or in combination of two or more kinds thereof.

The copolymerizable monomer used in combination with a styrene-based monomer is not particularly limited, however, examples of which include a (meth)acrylic acid ester; an acid anhydride such as maleic anhydride, citraconic anhydride, cis-1-cyclohexene-1,2-dicarboxylic acid anhydride, 3-methyl-cis-1-cyclohexene-1,2-dicarboxylic acid anhydride, and 4-methyl-cis-1-cyclohexene-1,2-dicarboxylic acid anhydride; a nitrile group-containing radical polymerizable monomer such as acrylonitrile, and methacrylonitrile; an amide bond-containing radical polymerizable monomer such as acrylamide, methacrylamide, and trifluoromethanesulfonylaminoethyl (meth)acrylate; fatty acid vinyls such as vinyl acetate; a chlorine-containing radical polymerizable monomer such as vinyl chloride, and vinylidene chloride; and conjugated diolefins such as 1,3-butadiene, isoprene, and 1,4-dimethylbutadiene. Among them, the copolymerizable monomer is preferably a (meth) acrylic acid ester, and maleic anhydride, and more preferably a (meth)acrylic acid ester.

The (meth)acrylic acid ester is not particularly limited, however, examples of which include methyl (meth)acrylate, ethyl (meth)acrylate, (i-, or n-)propyl (meth)acrylate, (n-, i-, sec-, or tert-)butyl (meth)acrylate, (n-, i-, or sec-)pentyl (meth)acrylate, (n-, or i-)hexyl (meth)acrylate, (n-, or i-)heptyl (meth)acrylate, (n-, or i-)octyl (meth)acrylate, (n-, or i-)nonyl (meth)acrylate, (n-, or i-)myristyl (meth)acrylate, 2-etylhexyl (meth)acrylate, ε-caprolactone (meth)acrylate, 2-hydroxyethyl (meth)acrylate, 2-hydroxypropyl acrylate, 3-hydroxypropyl (meth)acrylate, 4-hydroxybutyl (meth) acrylate, 2-hydroxybutyl (meth)acrylate, 2-methoxyethyl acrylate, 2-ethoxyethyl (meth)acrylate, phenyl acrylate, phenyl (meth)methacrylate, (2-, or 4-chlorophenyl) (meth)acrylate, (2-, 3-, or 4-ethoxycarbonylphenyl) (meth)acrylate, (o-, m-, or p-tolyl) (meth)acrylate, benzyl (meth)acrylate, phenethyl (meth)acrylate, 2-naphthyl (meth)acrylate, cyclohexyl (meth)acrylate, 4-methylcyclohexyl (meth)acrylate, and 4-ethylcyclohexyl (meth)acrylate.

Among the above-described styrene-based compounds, a styrene/maleic anhydride copolymer, a styrene/acrylic ester copolymer, a styrene/hydroxystyrene copolymer, and a styrene/acetoxystyrene copolymer are preferred, and a styrene/maleic anhydride copolymer is more preferred.

Other Plasticizers

In addition to the above-described plasticizer, that is, a carbohydrate derivative, a polyester compound, and a resin having a negative birefringence, the optical film according to the present embodiment may appropriately contain other plasticizers.

The other plasticizers are not particularly limited, and as the other plasticizers, a known plasticizer can be used. Specific examples of the other plasticizers include a polycarboxylate-based plasticizer, a glycolate-based plasticizer, a phthalate-based plasticizer, a fatty acid ester-based plasticizer, a polyhydric alcohol ester-based plasticizer, and a phosphate-based plasticizer. Among them, a polyhydric alcohol ester-based plasticizer, and a phosphate-based plasticizer are preferably used.

Examples of the polyhydric alcohol ester-based plasticizer include a compound described in [0127] to [0170] of JP-A No. 2010-32655, and a compound described in [0138] to [0156] of JP-A No. 2009-286931.

Examples of the phosphate-based plasticizer include triphenyl phosphate (TPP), tricresyl phosphate, cresyl diphenyl phosphate, octyl diphenyl phosphate, diphenyl biphenyl phosphate (BDP), trioctyl phosphate, and tributyl phosphate. Among them, triphenyl phosphate (TPP), and diphenyl biphenyl phosphate (BDP) are preferably used.

The weight average molecular weight (Mw) of the above-described plasticizer is preferably 15000 or less, more preferably 100 to 10000, and furthermore preferably 400 to 8000. When the weight average molecular weight (Mw) of the plasticizer is 15000 or less, the moist heat resistance of an optical film is improved, and the high compatibility between cellulose ester and cellulose ether can be obtained, therefore, this is preferred. Further, in the present specification, as the value of "weight average molecular weight (Mw) of the plasticizer", a value calculated by a measurement using gel permeation chromatography (GPC) under the following measurement conditions is employed.

[Chemical Formula 18]

Solvent: methylene chloride
Column: Shodex K806, K805, and K803G (manufactured by SHOWA DENKO K.K., used by connecting three of the columns)
Column temperature: 25° C.
Sample concentration: 0.1% by mass
Detector: RI Model 504 (manufactured by GL Science Ltd.)
Pump: L6000 (manufactured by Hitachi, Ltd.)
Flow rate: 1.0 mL/min
Calibration curve: using a calibration curve by 13 samples of Standard polystyrene STK standard polystyrene (manufactured by TOSOH CORPORATION), Mw=1000000 to 500. These 13 samples are used at approximately equal intervals.

The content of the above-described plasticizer is preferably 1.0 to 30.0 parts by mass, and more preferably 8.0 to 15.0 parts by mass based on 100 parts by mass in total of cellulose ester and cellulose ether. When the content of a plasticizer is in the above-described range, an optical film is hydrophobized, and the water resistance can be improved, therefore, this is preferred.

(Hydrogen Bonded Compound)

A hydrogen bonded compound has a function in which fluctuation of a retardation value Rt for the change of humidity is decreased. In one embodiment of the present invention, it is preferred that an optical film contains a hydrogen bonded compound.

The hydrogen bonded compound is not particularly limited, however, a compound in which (1) both of a hydrogen-bond donor part and a hydrogen-bond acceptor part are possessed in one molecule, (2) the value obtained by dividing the molecular weight by the total number of the hydrogen-bond donors and the hydrogen-bond acceptors is in the range of 30 to 65, and (3) the total number of aromatic ring structures is 1 to 3 is mentioned.

Examples of the compound include compounds expressed in the general formulae (A) to (H) shown below.

[Chemical formula 19]

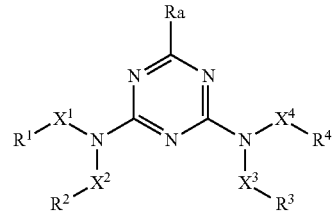

General formula (A)

In the above formula, Ra represents an alkyl group, an alkenyl group, an alkynyl group, a heterocyclic group, or an aryl group. $X^1$, $X^2$, $X^3$, and $X^4$, each independently represents a single bond, or a divalent linking group. $R^1$, $R^2$, $R^3$, and $R^4$, each independently represents a hydrogen atom, an alkyl group, an alkenyl group, an alkynyl group, an aryl group, or a heterocyclic group.

[Chemical formula 20]

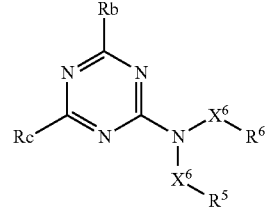

General formula (B)

In general formula, Rb, and Rc, each independently represents an alkyl group, an alkenyl group, an alkynyl group, a heterocyclic group, or an aryl group. $X^5$, and $X^6$, each independently represents a single bond, or a divalent linking group. $R^5$, and $R^6$, each independently represents a hydrogen atom, an alkyl group, an alkenyl group, an alkynyl group, an aryl group, or a heterocyclic group.

The suitable example of the general formula (A) is mentioned, for example, in paragraphs [0029] to [0041] of JP-A No. 2012-82235. The suitable example of the general formula (B) is mentioned, for example, in paragraphs [0044]

to [0053] of JP-A No. 2012-82235. As the specific example of the compound expressed in the general formula (A) or the general formula (B), for example, a compound described in paragraphs [0055] to [0057] of JP-A No. 2012-82235 is mentioned.

[Chemical formula 21]

General formula (C)

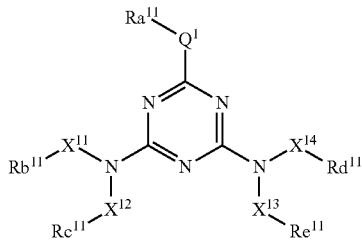

In the general formula (C), $Ra^{11}$ represents an alkyl group, an alkenyl group, an alkynyl group, an aryl group, or a heterocyclic group. $Rb^{11}$, $Rc^{11}$, $Rd^{11}$, and $Re^{11}$, each independently represents a hydrogen atom, an alkyl group, an alkenyl group, an alkynyl group, an aryl group, or a heterocyclic group. $Q^1$ represents an oxygen atom, a sulfur atom, or NRf, and Rf represents a hydrogen atom, an alkyl group, an alkenyl group, an alkynyl group, an aryl group, or a heterocyclic group, and may be bonded to $Ra^{11}$ to form a ring. $X^{11}$, $X^{12}$, and $X^{13}$, each independently represents a single bond, or a divalent linking group. $X^{14}$ represents a divalent linking group.

[Chemical formula 22]

General formula (D)

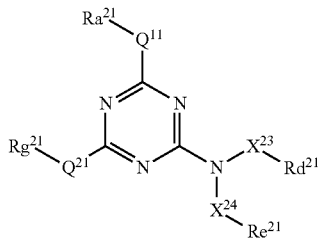

In the above formula, $Ra^{21}$, and $Rg^{21}$, each independently represents an alkyl group, an alkenyl group, an alkynyl group, an aryl group, or a heterocyclic group. $Rd^{21}$, and $Re^{21}$, each independently represents a hydrogen atom, an alkyl group, an alkenyl group, an alkynyl group, an aryl group, or a heterocyclic group. $Q^{11}$ represents an oxygen atom, a sulfur atom, or NRf, and Rf represents a hydrogen atom, an alkyl group, an alkenyl group, an alkynyl group, an aryl group, or a heterocyclic group, and may be bonded to $Ra^{21}$ to form a ring. $Q^{12}$ represents an oxygen atom, a sulfur atom, or NRh, and Rh represents a hydrogen atom, an alkyl group, an alkenyl group, an alkynyl group, an aryl group, or a heterocyclic group, and may be bonded to $Rg^{21}$ to form a ring. $X^{23}$ represents a single bond, or a divalent linking group. $X^{24}$ represents a divalent linking group.

The suitable example of the general formula (C) is mentioned, for example, in paragraphs [0060] to [0062] of JP-A No. 2012-82235. The suitable example of the general formula (D) is mentioned, for example, in paragraphs [0064] to [0066] of JP-A No. 2012-82235. As the specific example of the compound expressed in the general formula (C) or the general formula (D), for example, a compound described in paragraphs [0068] to [0071] of JP-A No. 2012-82235 is mentioned.

[Chemical formula 23]

General formula (E)

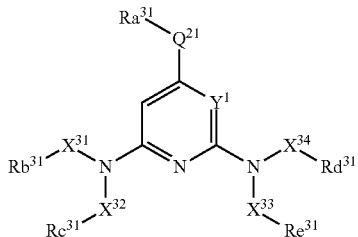

In the above formula, $Y^1$ represents a methine group, or —N=. $Ra^{31}$ represents an alkyl group, an alkenyl group, an alkynyl group, an aryl group, or a heterocyclic group. $Rb^{31}$, $Rc^{31}$, $Rd^{31}$, and $Re^{31}$, each independently represents a hydrogen atom, an alkyl group, an alkenyl group, an alkynyl group, an aryl group, or a heterocyclic group. $Q^{12}$ represents a single bond, or —O—, —S—, or —$NR_f$—, $R_f$ represents a hydrogen atom, an alkyl group, an alkenyl group, an alkynyl group, an aryl group, or a heterocyclic group, and may be bonded to $Ra^{31}$ to form a ring. $X^{31}$, $X^{32}$, and $X^{33}$, each independently represents a single bond, or a divalent linking group. $X^{34}$ represents a linking group selected from the group consisting of the divalent linking groups expressed in the following general formula (Q)

[Chemical formula 24]

General formula (Q)

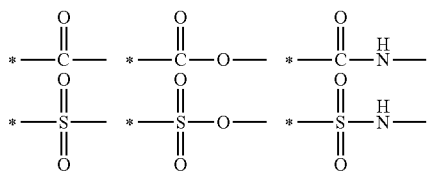

(In the general formula (Q), the * side is the linking site with the N atom substituting on the heterocyclic ring in the compound expressed in the above general formula (E).)

[Chemical formula 25]

General formula (F)

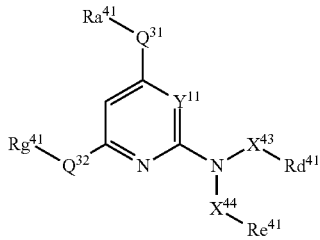

In the above formula, $Y^{11}$ represents a methine group, or —N—. $Ra^{41}$, and $Rg^{41}$ represents an alkyl group, an alkenyl group, an alkynyl group, an aryl group, or a heterocyclic group. $Rd^{41}$, and $Re^{41}$, each independently represents a hydrogen atom, an alkyl group, an alkenyl group, an alkynyl group, an aryl group, or a heterocyclic group. $Q^{31}$ represents —O—, —S—, or —$NR_f$—, $R_f$ represents a hydrogen atom, an alkyl group, an alkenyl group, an alkynyl group, an aryl group, or a heterocyclic group, and may be bonded to $Ra^{11}$ to form a ring. $Q^{32}$ represents —O—, —S—, or —$NR_h$—, $R_h$ represents a hydrogen atom, an alkyl group, an alkenyl group, an alkynyl group, an aryl group, or a heterocyclic group, and may be bonded to $Rg^{41}$ to form a ring. $X^{43}$ represents a single bond, or a divalent linking group. $X^{44}$ represents a divalent linking group.

The suitable example of the general formula (E) is mentioned, for example, in paragraphs [0075] to [0076] of JP-A No. 2012-82235. The suitable example of the general formula (F) is mentioned, for example, in paragraphs [0078] to [0081] of JP-A No. 2012-82235. As the specific example of the compound expressed in the general formula (E) or the general formula (F), for example, a compound described in paragraphs [0083] to [0091] of JP-A No. 2012-82235 is mentioned.

[Chemical formula 26]

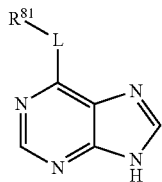

General formula (G)

In the above formula, $L^1$ represents a single bond, or a divalent linking group containing a hetero atom, and is preferably a divalent linking group containing a hetero atom. The divalent linking group containing the hetero atom, which is represented by $L^1$, is preferably a linking group in which one and the same atom has two chemical bonds participating in the linking. Examples of the linking group include —O—, —N($R^{82}$)—, —C(=O)—, —S—, —S(=O)$_2$—, and a linking group in combination thereof. Further, the range of $R^{82}$ is the same as the range of $R^3$, and the preferred range of $R^{82}$ is a hydrogen atom, or an alkyl group having 1 to 15 carbon atoms (more preferably having 1 to 10 carbon atoms, particularly preferably 1 to 5 carbon atoms, and more particularly preferably a methyl group). Among them, —O—, —NH—, —N(CH$_3$)—, —C(=O)—, and a linking group in combination thereof are preferred, and —O—, —NH—C(=O)—, and —N(CH$_3$)— are more preferred. Further, in the above formula, $R^{81}$ represents a hydrogen atom, an alkyl group having 1 to 20 carbon atoms, an alkenyl group having 1 to 20 carbon atoms, an alkynyl group having 2 to 20 carbon atoms, a heteroaryl group having 5 to 20 carbon atoms, or an aryl group having 6 to 20 carbon atoms.

The suitable example of the general formula (G) is mentioned, for example, in paragraphs [0097] to [0107] of JP-A No. 2012-82235. As the specific example of the compound expressed in the general formula (G), for example, a compound described in paragraphs [0109] to [0111] of JP-A No. 2012-82235 is mentioned.

[Chemical formula 27]

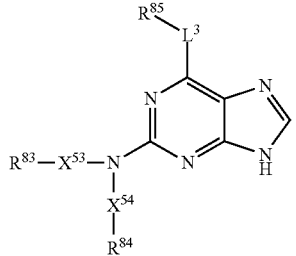

General formula (H)

In the above formula, $L^3$ represents a single bond, or a divalent linking group containing a hetero atom, and $R^{85}$ represents an alkyl group having 1 to 20 carbon atoms, an alkenyl group having 2 to 20 carbon atoms, an alkynyl group having 2 to 20 carbon atoms, an aryl group having 6 to 20 carbon atoms, or an arylalkyl group having 7 to 20 carbon atoms. $R^{83}$, and $R^{84}$, each independently represents a hydrogen atom, an alkyl group, an alkenyl group, an alkynyl group, an aryl group, or a heterocyclic group. $X^{53}$, and $X^{54}$, each independently represents a divalent linking group.

As the specific example of the compound represented by the general formula (H), for example, a compound described in a paragraph [0113] of JP-A No. 2012-82235 is mentioned.

The molecular weight of each of the hydrogen bonded compounds represented by the general formulae (A) to (D) is preferably 100 to 1000, more preferably 150 to 700, and most preferably 150 to 450.

As another example of the hydrogen bonded compound, a compound described in a paragraph [0029] of JP-A No. 2011-227508 is mentioned, and 3-methyl salicylic acid is preferably used.

The addition amount of a hydrogen bonded compound is not particularly limited, however, is preferably 35% by mass or less, more preferably 30% by mass or less, and particularly preferably 20% by mass or less, based on the total amount of cellulose ester and cellulose ether.

(UV Absorber)

An UV absorber has a function of absorbing UV rays. When an optical film has a function of absorbing UV rays, the UV absorber can suitably be used in the viewing side or backlight side of a polarizing plate to which the optical film is used.

The UV absorber is not particularly limited, however, examples of which include a benzotriazole-based UV absorber, a 2-hydroxybenzophenone-based UV absorber, and a phenyl salicylate-based UV absorber.

Specific examples include triazoles such as 2-(5-methyl-2-hydroxyphenyl) benzotriazole, 2-[2-hydroxy-3,5-bis(α,α-dimethylbenzyl) phenyl]-2H-benzotriazole, and 2-(3,5-di-t-butyl-2-hydroxyphenyl) benzotriazole; and benzophenones such as 2-hydroxy-4-methoxybenzophenone, 2-hydroxy-4-octoxybenzophenone, and 2,2'-dihydroxy-4-methoxybenzophenone.

Further, among the UV Absorbers, a UV absorber having a molecular weight of 400 or more is hardly sublimed, or hardly volatilized at a high boiling point, and thus has the nature of hardly being scattered even during the drying of a film at a high temperature, therefore, this is preferred. When the UV absorber has a molecular weight of 400 or more, the weatherability can effectively be improved by the addition of relatively small amount of the UV absorber.

The UV absorber having a molecular weight of 400 or more is not particularly limited, however, examples of which include a benzotriazole-based UV absorber such as 2-[2-hydroxy-3,5-bis(α,α-dimethylbenzyl) phenyl]-2-benzotriazole, and 2,2-methylenebis[4-(1,1,3,3-tetrabutyl)-6-(2H-benzotriazole-2-yl)phenol]; a hindered amine-based UV absorber such as bis(2,2,6,6-tetramethyl-4-piperidyl)sebacate, and bis(1,2,2,6,6-pentamethyl-4-piperidyl)sebacate; and a hybrid UV absorber having both structures of hindered phenol and hindered amine in a molecule, such as 2-(3,5-di-t-butyl-4-hydroxybenzyl)-2-n-butylmalonic acid bis(1,2,2,6,6-pentamethyl-4-piperidyl), and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. Among them, 2-[2-hydroxy-3,5-bis(α,α-dimethylbenzyl) phenyl]-2-benzotriazole, and 2,2-methylenebis[4-(1,1,3,3-tetrabutyl)-6-(2H-benzotriazole-2-yl)phenol] are preferably used.

The above-described UV absorber may be used alone, or as a mixture of two or more kinds thereof.

The UV absorber may be a product available on the market. Examples of the product available on the market include, for example, Tinuvin series such as Tinuvin 109, Tinuvin 171, Tinuvin 234, Tinuvin 326, Tinuvin 327, Tinuvin 328, and Tinuvin 928 (manufactured by BASF Japan Ltd.), and LA31 (2,2'-methylenebis[6-(2H-benzotriazol-2-yl)-4-(1,1,3,3-tetramethylbutyl)phenol], a molecular weight of 659, manufactured by ADEKA CORPORATION).

The content of the UV absorber differs depending on the kind of the UV absorber, use conditions, and the like, however, in general, is preferably 0.05 to 10% by mass, and more preferably 0.1 to 5% by mass based on the total amount of cellulose ester and cellulose ether.

(Mat Agent)

A mat agent has a function in which a slip property is imparted to an optical film. A mat agent usually has a shape of fine particle.

The mat agent is not particularly limited as long as the transparency of an optical film is not excessively impaired, and further there is heat resistance during the melting. Therefore, any mat agent of an inorganic compound or an organic compound can be used.

As the mat agent, silicon dioxide that has a refractive index approximate to that of cellulose ester is preferably used.

As the silicon dioxide, a product available on the market may be used. Examples of which include AEROSIL 200V, AEROSIL R972V, AEROSIL R972, R974, R812, 200, 300, R202, OX50, TT600, and NAX50 (manufactured by NIPPON AEROSIL CO., LTD.), SEAHOSTAR KEP-10, SEAHOSTAR KEP-30, and SEAHOSTAR KEP-50 (manufactured by NIPPON SHOKUBAI CO., LTD.), SYLOPHOBIC 100 (manufactured by FUJI SILYSIACHEMICAL LTD.), NIPSEAL E220A (manufactured by Nippon Silica Industrial Co., Ltd.), and ADMAFINE SO (manufactured by Admatechs Company Limited).

The shape of a mat agent is not particularly limited, and can be an amorphous shape, a needle shape, a flat shape, a spherical shape, or the like. Among them, when a mat agent has a spherical shape, the optical film shows a favorable transparency, therefore, this is preferred. Further, when particles having a different shape from each other, such as a needle shape, and a spherical shape, are used in combination, both of the transparency and the slip property can highly be satisfied, therefore, this is preferred.

The particle diameter of a mat agent is preferably 80 to 180 nm. In addition, when the particles have a structure of an aggregate of primary particles, the particle diameter of the particle means the particle diameter. Further, the particle diameter means a diameter of a circle corresponding to a projection area.

The content of a mat agent is not particularly limited, however, is preferably 0.05 to 10% by mass, and more preferably 0.1 to 5% by mass based on the total amount of cellulose ester and cellulose ether.

(Ionic Surfactant)

An ionic surfactant has a function of decreasing the releasing force of the optical film produced by a film forming.

As the ionic surfactant, the ionic surfactant is not particularly limited, and a cationic surfactant, an anionic surfactant, an amphoteric surfactant, or the like can be used.

Examples of the cationic surfactant include an aliphatic amine salt, an aliphatic quaternary ammonium salt, a benzalkonium salt, benzethonium chloride, a pyridinium salt, and an imidazolinium salt.

Examples of the anionic surfactant include sulfuric ester salts of higher alcohol ($C_8$ to $C_{22}$) (for example, a sodium salt of laurylalcohol sulfate, a sodium salt of octylalcohol sulfate, an ammonium salt of laurylalcohol sulfate, "Teepol-81" (manufactured by Shell Chemicals Japan Ltd.), and secondary sodium alkyl sulfate), phosphoric ester salts of aliphatic alcohol (for example, a sodium salt of cetyl alcohol phosphoric ester), alkyl aryl sulfonates (for example, a sodium salt of dodecyl benzene sulfonic acid, a sodium salt of isopropyl naphthalene sulfonic acid, a sodium salt of dinaphthalene disulfonic acid, a sodium salt of methanitro benzene sulfonic acid), sulfonates of alkyl amide (for example, $C_{17}H_{33}CON(CH_3)CH_2SO_3Na$), and sulfonate of dibasic fatty acid ester (for example, sodium sulfosuccinic acid dioctyl ester, and sodium sulfosuccinic acid dihexyl ester). Among them, sulfates, and sulfonates are suitably used.

Examples of the amphoteric surfactant include a carboxybetaine type amphoteric surfactant, a sulfobetain type amphoteric surfactant, an aminocarxylate, and imidazolinium betain.

Among the above-described surfactants, an anionic surfactant is preferably used.

The content of a surfactant is preferably 0.01 to 5% by mass, more preferably 0.05 to 3% by mass, and furthermore preferably 0.2 to 2% by mass based on the total amount of cellulose ester and cellulose ether. When the content of a surfactant is 0.01% by mass or more, a function as a surfactant can suitably be exerted, therefore, this is preferred. On the other hand, when the content of a surfactant is 5% by mass or less, precipitation of a surfactant, increase of excessive moisture absorption of an optical film, and the like are hardly generated, therefore, this is preferred.

<Production Method of Optical Film>

In one embodiment, an optical film can be produced by a known method. Examples of the production method include an inflation method, a T-die method, a calender method, a cutting method, an emulsion method, a hotpress method, a solution casting method, and a melt casting method. Among them, the production method is preferably a solution casting method, and a melt casting method from the viewpoint of suppressing coloring, suppressing foreign matter defects, suppressing an optical defect such as a die line, and the like, and more preferably a solution casting method from the viewpoint of obtaining more uniform surface.

Hereinafter, a solution casting method, and a melt casting method will be described in detail.

[Solution Casting Method]

In a case where film forming is performed by a solution casting method, the production method of an optical film according to the present embodiment preferably includes a step of preparing a dope by the dissolution of cellulose ester, cellulose ether, and as needed the above-described additives into a solvent (dissolution step, dope preparation step), a step of casting a dope onto an infinitely moving endless metal support (casting step), a step of drying a cast dope as a web (solvent evaporation step), a step of releasing from a metal support (releasing step), a step of drying and/or stretching (drying and stretching step), and a step of winding a finished film (winding step).

(1) Dissolution Step (Dope Preparation Step)

The present step is a step in which cellulose ester, cellulose ether, any other additives, and the like are dissolved into an organic solvent that mainly contains a solvent favorable for cellulose ester and cellulose ether while being stirred in a dissolving kettle, and a dope is prepared. The dope may be prepared by the introducing of a solution containing cellulose ether, and any other additives into a cellulose ester solution.

The organic solvent useful for the preparation of a dope is not particularly limited as long as being a solvent that can dissolve cellulose ester, cellulose ether, and any additives at the same time.

Examples of the organic solvent include a chlorine-based organic solvent such as methylene chloride; and a chlorine-free organic solvent such as methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, and 2,2,3,3,3-pentafluoro-1-propanol, nitroethane. Among them, methylene chloride, methyl acetate, ethyl acetate, and acetone are preferably used.

Into a dope, in addition to the organic solvents described above, straight chain or branched chain aliphatic alcohol is preferably contained. Examples of the straight chain or branched chain aliphatic alcohol having 1 to 4 carbon atoms include methanol, ethanol, propanol, isopropyl alcohol, n-butanol, sec-butanol, and tert-butanol. Among them, ethanol is preferred because of the stability of a dope, the relatively low boiling point, the favorable drying property, and the like.

The content of the straight chain or branched chain aliphatic alcohol is preferably 1 to 40% by mass based on the total amount of dope. When the content of alcohol in a dope is 1% by mass or more, a web gels, and is easily released from a metal support, therefore, this is preferred. On the other hand, when the content of alcohol in a dope is 40% by mass or less, dissolution of cellulose ester, cellulose ether, and any additives can be promoted in a chlorine-free organic solvent system, therefore, this is preferred.

The dope prepared in the present step is particularly preferably a dope composition in which cellulose ester, cellulose ether, and any additives are dissolved in an amount of 15 to 45% by mass in total into a solvent containing methylene chloride, and straight chain or branched chain aliphatic alcohol having 1 to 4 carbon atoms.

The dissolution of cellulose ester, cellulose ether, and other additives can be performed by using various dissolution methods of a method of performing at normal pressure, a method of performing at a boiling point or less of a main solvent, a method of performing by the pressurization at a boiling point or more of a main solvent, a method of performing by a cooling dissolution method described in JP-A No. H9-95544, JP-A No. H9-95557, or JP-A No. H9-95538, a method of performing at high pressure, which is described in JP-A No. H11-21379, and the like, however, a method of performing by the pressurization at a boiling point or more of a main solvent is preferably used.

The total content (total amount) of cellulose ester and cellulose ether in a dope is preferably 15 to 45% by mass based on the total amount of dope. When the content of cellulose ester is 15% by mass or more, the drying load after the casting onto a metal support can be reduced, therefore, this is preferred. On the other hand, when the content of cellulose ester is 45% by mass or less, favorable filtration precision can be obtained, therefore, this is preferred.

In the prepared dope, impurities are preferably removed by filtration or the like.

FIG. 1 is a drawing schematically illustrating one example of a dope preparation step, a casting step, and a drying step in a solution casting film forming method preferred for the present embodiment.

A solution is transferred from a feeding kettle 41 to a filter 44 by a pump 43, large aggregates are removed in a filter 44, and the solution is sent to a stock kettle 42. After that, various additive liquids are added from a stock kettle 42 into a main dope dissolving kettle 1.

Subsequently, a main dope is transferred to a main filter 3 by a liquid feeding pump 2, filtered by a main filter 3, transferred to a filter 6 by a liquid feeding pump 5, and via a conduit 8, then into the dope, an UV absorber additive liquid is added in line from a conduit 16 at a junction pipe 20.

In many cases, into a main dope, a return material may be contained in an amount of around 10 to 50% by mass. Further, the return material is a material obtained by the fine pulverization of an optical film. Specific examples of the return material include film parts obtained by the cutting off of both side parts of a film, which are generated during the film forming of an optical film, and a film web that is an out-of-specification product because of a scratch or the like.

Further, as the raw material of a resin used for the preparation of a dope, a material obtained in advance by the pelletization of cellulose ester, cellulose ether, other additives, and the like can also be preferably used.

(2) Casting Step

In the present step, a dope is cast onto a metal support. That is, The present step is a step in which a dope is sent to a pressure die 30 through a liquid feeding pump (for example, a pressure type metering gear pump), and a dope is cast from a pressurized die slit at a casting position on a metal support such as an infinitely moving endless metal belt 31, for example, a stainless steel belt, or a rotating metal drum.

As the pressure die, a die, in which a slit shape in a mouthpiece part can be adjusted, and with which the film thickness is easily made uniform, is preferred. The pressure die includes a coat hanger die, a T-die, and the like, and any of which is preferably used. The surface of a metal support is preferably a mirror surface. In order to increase the film forming rate, two or more pressure dies are arranged onto a metal support, and the dope amount may be divided and laminated. Alternatively, it is also preferred to obtain a film having a laminate structure by a co-casting method in which multiple dopes are cast at the same time.

The width of the cast is preferably 4 m or less, more preferably 1.4 to 4 m from the viewpoint of the productivity, and furthermore preferably 2.2 to 3.5 m from the viewpoint of the transportability and the productivity. When the width of the cast is 4 m or less, the width is preferred from the viewpoint of the prevention of the stripes that can be generated in an optical film in a production process, and the viewpoint of the stability in a transportation process.

(3) Solvent Evaporation Step

The present step is a step in which a web (a dope is cast onto a support for casting, and the formed dope film is referred to as a web) is heated on a support 31 for casting, and a solvent is evaporated.

Examples of the method for evaporating a solvent include a method of blowing wind from a web side, a method of heat transmitting by a liquid from the back side of a support, and a method of heat transmitting from the front and back sides by radiant heat. Among them, from the viewpoint of the drying efficiency, a back side liquid heat transmitting method is preferred. Further, these methods may be performed alone, or in combination thereof. A web on the support after casting is preferably dried on the support under an atmosphere of 40 to 100° C. In order to maintain under the atmosphere of 40 to 100° C., it is preferred to apply hot air at this temperature on the top surface of a web, or to heat the web by a measure of infrared rays or the like.

From the viewpoint of the face quality, the moisture permeability, and the releasability, it is preferred to release the web from a support within 30 to 120 seconds.

(4) Releasing Step

Next, a web is released from a metal support 31. That is, the present step is a step in which a web from which a solvent has been evaporated on a metal support is released at a release position 33. The released web is sent to the next step.

Further, the residual amount of a solvent at the releasing of a web on a metal support at the time point of the releasing differs also depending on the strength of the drying conditions, the length of the metal support, and the like, however, is preferably 50 to 120% by mass. However, without being limited to those, the residual amount of a solvent at the releasing is determined by a balance between the economical speed and the quality. Further, by the appropriate control of a residual amount of a solvent, favorable planarity at the releasing is provided, and the generation of a twitch, or a vertical streak by releasing tension can be prevented. In addition, in the present specification, the value of the "residual amount of a solvent" is calculated by the following formula.

Residual amount of a solvent (% by mass)=(mass before heat treatment of a web−mass after heat treatment of a web)/(mass after heat treatment of a web)×100     [Mathematical formula 10]

Further, in the above formula, the "heat treatment" means a heat treatment at 140° C. for one hour.

In general, the releasing tension at the time of releasing a film from a metal support is preferably 100 to 245 N/m. In a case where wrinkles are easily generated during the releasing, it is more preferred that the releasing is performed by a tension of 190 N/m or less.

The temperature at a release position of the metal support is preferably −50 to 40° C., more preferably 10 to 40° C., and most preferably 15 to 30° C.

(5) Drying and Stretching Step

After the releasing, by using a drying device 35 in which a web is transported by alternately passing the multiple rollers arranged in the drying device, and/or a tenter stretching device 34 in which a web is transported by the clipping of both ends of the web with a clip, a web is dried.

As the drying measure, a method of blowing hot air on both surfaces of a web is commonly used, however, instead of the hot air, microwaves may be applied for the heating. The drying is preferably slowly performed from the viewpoint of favorably maintaining the planarity of the obtained optical film. The drying preferably starts from the time when the residual amount of a solvent is 15% by mass or less. Throughout the drying, the drying is performed preferably at −35 to 250° C., and more preferably 40 to 200° C.

In a case where a tenter stretching device is used, it is preferred to use a device that can control the film holding length (the distance from the holding start to the holding finish) independently at each of the right and left sides by a right and left holding measures of a tenter. Further, in the tenter step, it is preferred to intentionally make partitions having a different temperature from each other in order to improve the planarity.

In addition, from the viewpoint of preventing the interference due to each partition between the different temperature partitions, it is preferred to provide a neutral zone.

Before or after the above-described drying step, a web is preferably subjected to a stretching treatment at least in one direction from a metal support. By performing a stretching treatment, a molecular orientation in a film can be controlled. Consequently, an optical film having an intended film thickness, retardation, and the like can be obtained. In addition, in the stretching, a known roller stretching machine, a tenter, or the like can preferably be used. The stretched film may be a uniaxially stretched film, however, is preferably a biaxially stretched film that is biaxially stretched in a casting direction (MD direction) and in a width direction (TD direction). However, the stretching step is not required, and the optical film according to the present embodiment may be an unstretched film.

The method of uniaxially or biaxially stretching an optical film is not particularly limited, and a known technique can appropriately be applied. In the uniaxial stretching, the stretching can be performed by free-end uniaxial stretching in which the change of a film in a width direction is free, or by fixed-end uniaxial stretching in which the change of a film in a width direction is fixed. In the biaxially stretching, the stretching can be performed by sequential biaxial stretching, or by simultaneous biaxial stretching in which longitudinal and lateral stretchings are performed at the same time. In addition, in the sequential biaxial stretching, for example, the stretchings in a different stretching direction from each other can be also sequentially performed, and the stretching in the same direction is divided in multiple stages, and stretchings in a different stretching direction from each other can also be added into any of the multiple stages. That is, for example, the following stretching steps can also be performed.

Stretching in a casting direction→stretching in a width direction→stretching in a casting direction→stretching in a casting direction Stretching in a width direction→stretching in a width direction→stretching in a casting direction→stretching in a casting direction Further, in the simultaneous biaxial stretching, a case where stretching is performed in one direction, and in the other direction, tension is relaxed to perform contracting is also included.

The stretch ratio of an optical film is preferably 1.1 to 9 times, and more preferably 1.2 to 5 times in total stretch ratio in the casting direction and width direction. Further, the stretch ratio of simultaneous biaxial stretching is preferably 1.01 times to 1.5 times in both of the width direction and the longitudinal direction.

The stretching temperature is preferably in a temperature range of Tg to Tg+60° C. of a resin that constitutes a film.

The residual amount of a solvent of a web in a case where tenter is performed is preferably 20 to 100% by mass at the time of starting the tenter. Further, the drying is preferably performed while applying tenter until the residual amount of a solvent of a web becomes 10% by mass or less, and more preferably 5% by mass or less.

The drying temperature in a case where tenter is performed is preferably 30 to 160° C., and more preferably 50 to 150° C.

In the tenter step, it is preferred that the temperature distribution in a width direction of an atmosphere is less from the viewpoint of increasing the uniformity of a film. The temperature distribution in a width direction in the tenter step is preferably within ±5° C., more preferably within ±2° C., and most preferably within ±1° C.

(6) Winding Step

In the end, the obtained web (finished film) is wound, and an optical film is obtained. More specifically, the present step is a step in which after the residual amount of a solvent in a web becomes 2% by mass, the web is wound as an optical film by a winding machine 37. In the winding, the residual amount of a solvent is set as preferably 0.4% by mass or less, and more preferably 0.00 to 0.10% by mass, and as a result, an optical film having favorable dimensional stability can be obtained.

As the winding method, a generally used method may be employed, a constant torque method, a constant tension method, a taper tension method, a program tension controlling method with constant internal stress, or the like can be applied.

Before the winding, the ends are slit and trimmed off to obtain the width of a product, and in order to prevent the sticking and scratches during the winding, a knurl processing (emboss processing) may be performed at both ends. In a method of the knurl processing, a metal ring having a convex-concave pattern on the side surface can be processed by heating and pressurization. Further, in the holding part of a clip at both ends of a film, a film is generally deformed, and cannot be used as a product, therefore, is usually removed. In a case where degradation of a material by heating is not generated, the material can be reused after the recovery.

The optical film is preferably a long film. Specifically, the optical film is a long film having a length of around 100 to 10000 m, and in general, is provided in a form of a roll. Further, the width of the film is preferably 1.4 to 4 m, and more preferably 2 to 3 m from the viewpoint of the increase in size of a liquid crystal display, and the efficiency of production.

[Melt Casting Method]

The melt casting method is a method in which a composition containing cellulose ester, cellulose ether, and the above-described additives is heated and melted until the temperature showing the flowability, and then the molten material is cast.

The melt casting method can be classified, in more detail, into a melt extrusion molding method, a press molding method, an inflation method, an injection molding method, a blow molding method, a stretching molding method, and the like. Among them, a melt extrusion method is preferred from the viewpoint of the mechanical strength, the surface precision, and the like.

It is preferred that the multiple raw materials to be used in a melt extrusion method is kneaded and pelletized in advance in general. The pelletization can be performed by a known method. For example, the pelletization can be performed as follows: dried cellulose ester or cellulose ether, a plasticizer, and other additives are supplied to an extruder by a feeder, and kneaded by using a uniaxial or biaxial extruder; the kneaded resultant is extruded from a die in a form of strand; the extruded resultant is water-cooled, or air-cooled; and the cooled resultant is cut.

The additives may be mixed before being supplied to an extruder, or may be supplied separately to an extruder by an individual feeder.

A small amount of an additive such as particles, and an antioxidant is preferably mixed in advance in order to be uniformly mixed.

The extruder is preferably an extruder in which the shearing force is suppressed, the pelletization can be performed so that the cellulose ester and the cellulose ether are not deteriorated (do not generate the decrease of molecular weight, the coloring, the gel formation, and the like), and the processing is performed at a temperature as low as possible. For example, in a case of a biaxial extruder, it is preferred to rotate the biaxial extruder in the same direction by using a deep groove type of screw. From the viewpoint of the uniformity of the kneading, a meshing type of biaxial extruder is preferred.

By using the pellets thus obtained, the film forming is performed. Of course, the powders of a raw material are supplied to an extruder as they are without being pelletized, and then a film may be formed.

The melting temperature at the time of extruding the pellets by using a uniaxial or biaxial type of extruder is in a temperature range of 200 to 300° C. The melted resultant is filtered by a leaf-disc type filter, or the like to remove foreign matters, and then cast from a T-die in a film form. Next, the resultant film is nipped by a cooling roller and an elastic touch roller, and solidified on a cooling roller.

At the time of introducing the pellets from a feed hopper into an extruder, it is preferred to prevent the oxidative decomposition and the like under vacuum, under reduced pressure, or under an inert gas atmosphere.

It is preferred that the extruding flow rate is stable by the introduction of a gear pump, and the like. Further, as the filter to be used for the removal of foreign matters, a stainless fiber sintered filter is preferably used. The stainless fiber sintered filter is a stainless fiber sintered filter in which a complicatedly entangled state of a stainless fiber body is prepared, then compressed, and a contact part is sintered and integrated. The stainless fiber sintered filter can change the density depending on the thickness of a fiber and the amount of compression, and can adjust the filtration precision.

An additive such as a plasticizer, and particles may be mixed with a resin in advance, or may be kneaded on the way to an extruder. In order to uniformly add the additives, it is preferred to employ a mixing device such as a static mixer.

At the time of nipping an optical film by a cooling roller and an elastic touch roller, the film temperature on the side of the touch roller is preferably set in a temperature range of Tg to Tg+110° C. of a film. As the roller to be used for such a purpose, which has a surface of an elastic body, a known roller can be used.

The elastic touch roller is also referred to as a compression rotor. As the elastic touch roller, a product available on the market can be used.

When a film is released from a cooling roller, it is preferred to prevent the deformation of a film by the control of the tension.

Further, it is preferred that the film thus obtained passes through a step of being in contact with the cooling roller, and then is stretched by the stretching operation.

In the stretching method, a known roller stretching machine, a tenter, and the like can preferably be used. The specific conditions are the same as those in a case of a solution casting method.

Finally, as in a case of a solution casting method, by the winding of the film obtained as in the above, an optical film can be produced.

<Polarizing Plate and VA Type Liquid Crystal Display>

The constitution of a polarizing plate and a liquid crystal display, which are provided with the above-described optical film, will be described with reference to a drawing.

Figure 2:
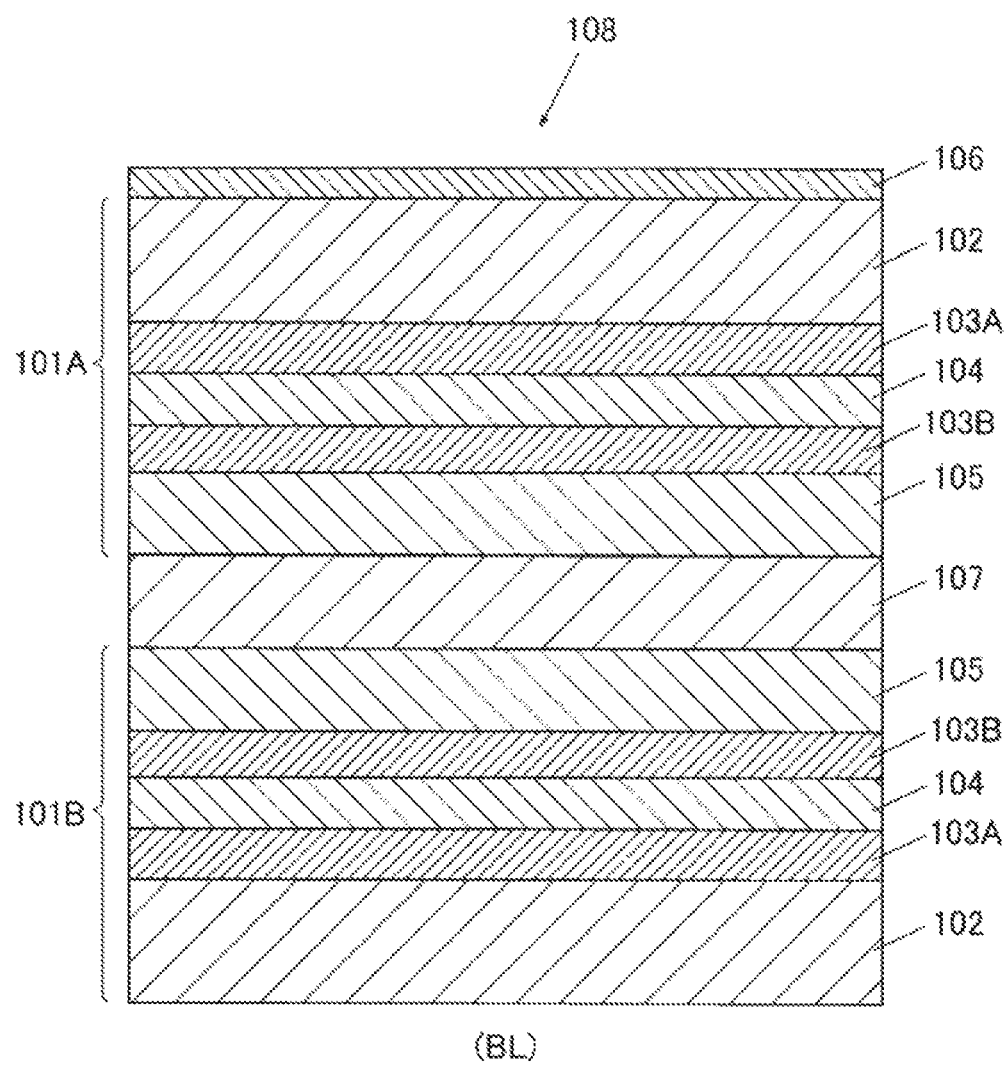
FIG. 2 is a schematic sectional view showing one example of the liquid crystal display constitution according to one embodiment of the present invention.

FIG. 2 is a schematic sectional view illustrating one example of the constitutions of a polarizing plate provided with the optical film according to the first embodiment, and a liquid crystal display provided with the polarizing plate.

The constitution in which in a polarizing plate 101A according to one embodiment of the present invention, at least a protective film 102, an active energy ray curable adhesive 103A, and a polarizer 104 are laminated in this order, and further, on a surface of the polarizer, which is opposite to the surface arranged with the protective film, an active energy ray curable adhesive 103B, and an optical film 105 according to the first embodiment are laminated is a preferred embodiment. That is, the polarizing plate 101A has a constitution in which an optical film 105 according to the first embodiment is bonded to a polarizer 104 with an active energy ray curable adhesive 103B.

Further, on the further outside (the outermost surface) of a protective film 102, for example, a functional layer 106 such as an anti-glare layer, an anti-reflection layer, an anti-fouling layer, and a hard coat layer may be provided as needed.

It is preferred that an optical film 105 of the above-described polarizing plate 101A is bonded to a liquid crystal cell 107 via a sticker, an adhesive, or the like, and on the surface of the liquid crystal cell (backlight side, described as BL in the drawing), which is opposite to the surface on which the polarizing plate 101A and liquid crystal cell 107 are bonded, an optical film 105 of the present invention of a polarizing plate 101B that has the same constitution as that of the polarizing plate 101A is bonded, as a result of which a liquid crystal display 108 is constituted.

[Polarizing Plate]

The polarizing plate according to the present embodiment contains an optical film, a polarizer, and an adhesive. At this moment, the optical film and the polarizing plate are bonded with an adhesive.

(Optical Film)

As the optical film, the above-described optical film can be used, therefore, the description thereof is omitted here.

(Adhesive)

An adhesive is not particularly limited, and a known adhesive can be used. Specific examples of which include an active energy ray curable adhesive, an urethane-based adhesive, an epoxy-based adhesive, an aqueous polymer-isocyanate-based adhesive, a curing type adhesive such as a heat-curing type acrylic adhesive, a moisture-curing urethane adhesive, a polyether methacrylate type adhesive, an ester-based methacrylate type adhesive, an anaerobic adhesive such as an oxidation type polyether methacrylate, a cyanoacrylate-based instant adhesive, an acrylate- and per- oxide-based two-part type instant adhesive, and a polyvinyl alcohol-based adhesive. The above-described adhesive may be a solvent-based adhesive that uses an organic solvent as a medium, may be a water-based adhesive such as an emulsion type adhesive, a colloidal dispersion type adhesive, and a water-soluble type adhesive, which is a medium that uses water as a main component, or may be a solventless type adhesive. The concentration of an adhesive liquid is favorably appropriately determined depending on the film thickness after bonding, the applying method, the applying conditions, and the like, and is generally 0.1 to 50% by mass.

Among the above-described adhesives, as also shown in FIG. 2, it is preferred to use an active energy ray curable adhesive from the viewpoint of capable of effectively controlling the moisture permeability.

Preferred examples of the active energy ray curable adhesive include, for example, a photocurable adhesive composition containing each component of a (α) cationic polymerizable compound, a (β) photocationic polymerization initiator, a (γ) photosensitizer showing the maximum absorption for a light of a wavelength longer than 380 nm, and a (δ) naphthalene-based auxiliary photosensitizer, as disclosed in JP-A No. 2011-028234. However, an active energy ray curable adhesive other than the above, of course, may be used.

(Polarizer)

A polarizer that is a main constituent element of a polarizing plate is an element for passing only a light of polarization plane in a certain direction. The representative polarizer that is currently known is a polyvinyl alcohol polarizing film. The polyvinyl alcohol polarizing film includes the one obtained by staining a polyvinyl alcohol film with iodine, and the one obtained by staining a polyvinyl alcohol film with a dichroic dye.

As the polarizer, a polarizer in which a polyvinyl alcohol aqueous solution is film-formed, then the resultant film is uniaxially stretched and stained, or is stained and uniaxially stretched, and then the resultant is preferably subjected to a durability treatment with a boron compound can be used.

The film thickness of a polarizer is preferably in the range of 5 to 30 μm, and particularly in the range of 5 to 15 μm.

Further, an ethylene-modified polyvinyl alcohol having an ethylene unit content of 1 to 4% by mole, a polymerization degree of 2000 to 4000, and a saponification degree of 99.0 to 99.99% by mole, which is described in JP-A No. 2003-248123 and JP-A No. 2003-342322, is also preferably used. Among them, an ethylene-modified polyvinyl alcohol film in which the hot-water cutting temperature is in the range of 66 to 73° C., is preferably used. The polarizer using this ethylene-modified polyvinyl alcohol film is excellent in the polarization performance and the durability performance, and further has little color shade, therefore, is particularly preferably used for a large liquid crystal display.

(Protective Film)

In the polarizing plate of the present embodiment, as needed, as shown in FIG. 2, it is preferred that a protective film 102 is further laminated on a surface of the polarizer, which is opposite to the surface arranged with the optical film of the first embodiment via an active energy ray curable adhesive.

The protective film can be obtained as a product available on the market, and examples of which include, for example, Konica Minolta TAC KC4UE, KC8UE, KC8UX, KC5UX, KC8UY, KC4UY, KC4CZ, KC6UA, KC4UA, and KC2UA (manufactured by KONICA MINOLTA, INC.).

On the protective film that is particularly arranged on the viewing side, a functional layer such as a hard coat layer, an anti-static layer, an anti-reflection layer, a lubricative layer, an adhesive layer, an anti-glare layer, and a barrier layer is preferably provided.

[Production Method of Polarizing Plate]

A polarizing plate can be produced by the bonding of the optical film of the first embodiment on one surface of a polarizer using an active energy ray curable adhesive. In a case where the adhesiveness is different from each other on both surfaces of an optical film, it is preferred to bond a polarizer on the one surface having more favorable adhesiveness of the optical film.

Hereinafter, one example of a production method of a polarizing plate using an active energy ray curable adhesive will be described.

The polarizing plate can be produced by a production method including: an adhesive applying step in which the following active energy ray curable adhesive is applied on at least one of the surfaces bonding a polarizer and an optical film to each other, and an adhesive layer is formed; a bonding step in which a polarizer and an optical film are bonded and laminated via the adhesive layer; and a curing step in which the adhesive layer is cured in a state that a polarizer and an optical film are bonded to each other via the adhesive layer. Further, there may be a pretreatment step in which the surface of an optical film bonding to a polarizer is subjected to an easy adhesion treatment.

(Pretreatment Step)

In the pretreatment step, the surface of an optical film bonding to a polarizer is subjected to an easy adhesion treatment. In a case where an optical film and a protective film are bonded on each of both surfaces of a polarizer, respectively, the optical film and the protective film are respectively subjected to an easy adhesion treatment. In the next adhesive applying step, the surface that has been subjected to an easy adhesion treatment is handled as a surface bonding to a polarizer, therefore, one surface bonding to an active energy ray curable adhesive between both surfaces of an optical film is subjected to an easy adhesion treatment. Examples of the easy adhesion treatment include a corona treatment, and a plasma treatment.

(Adhesive Applying Step)

In the adhesive applying step, the active energy ray curable adhesive is applied on at least one of the surfaces bonding a polarizer and an optical film to each other. In a case where an active energy ray curable adhesive is applied directly on a surface of a polarizer or an optical film, there is no particular limitation on the applying method. For example, various wet application systems of a doctor blade, a wire bar, a die coater, a Comma coater, a gravure coater, and the like can be utilized. Further, a method in which an active energy ray curable adhesive is cast between a polarizer and an optical film, and then pressurized by a roller or the like to be uniformly spread out can be utilized.

(Bonding Step)

After an active energy ray curable adhesive is applied by the above-described method, a bonding step is performed. In the bonding step, for example, in a case where an active energy ray curable adhesive is applied on a surface of a polarizer in the previous applying step, onto the surface, an optical film is superimposed. In a case where an active energy ray curable adhesive is applied on a surface of an optical film in the previous applying step, onto the surface, a polarizer is superimposed. Further, in a case where an active energy ray curable adhesive is cast between a polarizer and an optical film, in this state, a polarizer and an optical film are superimposed. In a case where an optical film and a protective film are bonded on each of both surfaces of a polarizer, respectively, and further in a case where an active energy ray curable adhesive is used on both surfaces, an optical film and a protective film are superimposed on each of both surfaces of a polarizer, respectively, via an active energy ray curable adhesive. In general, in this state, pressurization is performed by sandwiching from both surfaces (when an optical film is superimposed on one surface of a polarizer, on the surface of the polarizer and on the surface of the optical film, or when an optical film and a protective film are superimposed on each of both surfaces of a polarizer, respectively, on both surfaces of the optical film and the protective film) using rollers, or the like. As the material of the rollers, a metal, rubber, or the like can be used. The rollers arranged on both surfaces may be made of the same material as each other, or a different material from each other.

(Curing Step)

In the curing step, an uncured active energy ray curable adhesive is irradiated with an active energy ray to cure the active energy ray curable adhesive containing a cationic polymerizable compound (for example, an epoxy compound, and an oxetane compound) or a radical polymerizable compound (for example, an acrylate-based compound, and an acrylamide-based compound), and the polarizer and optical film superimposed via an active energy ray curable adhesive, or a polarizer and an optical film are bonded. In a case where an optical film is bonded on one surface of a polarizer, the bonding may be irradiated with an active energy ray from either side of the side of the polarizer or the side of the optical film. Further, in a case where an optical film and a protective film are bonded on each of both surfaces of a polarizer, respectively, it is advantageous that the active energy ray curable adhesive on each of both surfaces are cured at the same time by the irradiation with an active energy ray in a state that the optical film and the protective film are superimposed via the active energy ray curable adhesive on each of both surfaces of the polarizer.

As the active energy ray applied to the curing, a visible light, an UV ray, a X ray, an electron beam, or the like can be used, however, since the handling is easy, and the curing rate is sufficient, generally an electron beam, or an UV ray is preferably used.

As the irradiation conditions of an electron beam, any appropriate conditions can be employed as long as the above-described adhesive can be cured under the conditions. For example, in the electron beam irradiation, the acceleration voltage is preferably in the range of 5 to 300 kV, and more preferably in the range of 10 to 250 kV. When the acceleration voltage is 5 kV or more, the adhesive can sufficiently be irradiated with the electron beam, and can suitably be cured, therefore, this is preferred. On the other hand, when the acceleration voltage is 300 kV or less, the damage to the optical film and the polarizer due to the rebounding of the electron beam, or the like can be prevented, therefore, this is preferred. The irradiation dose is in the range of 5 to 100 kGy, and more preferably in the range of 10 to 75 kGy. When the irradiation dose is 5 kGy or more, the adhesive can suitably be cured, therefore, this is preferred. On the other hand, when the irradiation dose is 100 kGy or less, the decrease of mechanical strength, and the yellowing can suitably be prevented by the prevention of the damage to the optical film and the polarizer, therefore, this is preferred.

As the irradiation conditions of an UV ray, any appropriate conditions can be employed as long as the above-described adhesive can be cured under the conditions. The irradiation dose of the UV ray is preferably in the range of 50 to 1500 mJ/cm², and more preferably in the range of 100 to 500 mJ/cm² in an integrated amount of light.

In a case where the production method is performed in a continuous line, the line speed is depending on the curing time of an adhesive, however, is preferably in the range of 1 to 500 m/min, more preferably 5 to 300 m/min, and furthermore preferably in the range of 10 to 100 m/min. When the line speed is 5 m/min or more, a polarizing plate in which the productivity is improved, or the damage to the optical film is small, and a durability test and the like are withstood can be prepared. Further, when the line speed is 300 m/min or less, the curing of the adhesive becomes sufficient, and the intended adhesiveness can easily be obtained.

In the polarizing plate obtained as in the above, the thickness of the adhesive layer is not particularly limited, however, generally in the range of 0.01 to 10 μm, and particularly in the range of 0.5 to 5 μm.

[VA Type Liquid Crystal Display]

The polarizing plate of the present invention has a high retardation value, therefore, can suitably be used for a VA type liquid crystal display as an optical compensation film (optical film) expanding a viewing angle. In the VA type liquid crystal display in which a polarizing plate of the present invention is used, an optical film having a low moisture permeability is used, therefore, the display unevenness due to the contained moisture is hardly generated.

The VA type liquid crystal display has a constitution in which the polarizing plate according to the present invention is provided at least on one surface of a liquid crystal cell.

The glass used for a panel of a VA type liquid crystal display has a thickness of preferably in the range of 0.3 to 0.7 mm, and further preferably in the range of 0.3 to 0.5 mm. The polarizing plate of the present invention is hardly deformed, therefore, in particular when the thickness of the glass is small, the polarizing plate is preferably used.

The bonding of the surface on the side of the optical film of the present invention, and the surface at least on one side of the liquid crystal cell in a polarizing plate can be performed by a known technique. In some cases, the bonding may be performed via an adhesive layer.

In such a liquid crystal display, a polarizing plate containing an optical film of the present invention is provided, as a result of which, a liquid crystal display in which the durability (moist heat resistance) is excellent, and further the visibility is excellent, that is, variations in phase difference are suppressed and there is no unevenness and the like of a liquid crystal display even in a liquid crystal display with a large screen of 30 inches or more can be obtained.

EXAMPLES

Hereinafter, the present invention will be described in detail by way of Examples, however, is not limited to those. In addition, the display of "parts" or "%" is used in Examples, however, represents "parts by mass" or "% by mass" unless otherwise noted.

Comparative Example 1

Fine Particle Dispersion Liquid 1

| | |
|---|---|
| Fine particles (mat agent) (AEROSIL R812, manufactured by NIPPON AEROSIL CO., LTD.) | 11 parts by weight, and |
| Ethanol | 89 parts by weight |

These were stirred and mixed for 50 minutes by a dissolver, and then the resultant mixture was dispersed by a Manton Gaulin homogenizer.

<Fine Particle Additive Liquid 1>

A fine particle dispersion liquid 1 was slowly added into a dissolution tank in which methylene chloride had been put while sufficiently being stirred. Further, the resultant mixture was dispersed by an Attritor so that the particle diameter of a secondary particle is a predetermined size. The resultant was filtered by a Finemet NF manufactured by Nippon seisen Co., Ltd., and a fine particle additive liquid 1 was prepared.

| | |
|---|---|
| Methylene chloride | 99 parts by weight |
| Fine particle dispersion liquid 1 | 5 parts by weight |

A dope liquid having the following composition was prepared. At first, methylene chloride, and ethanol were added into a pressurized dissolution tank. Cellulose acetate having an acetyl substitution degree of 2.9, and ethyl cellulose having an ethoxyl substitution degree of 2.3 were charged while being stirred into a pressurized dissolution tank in which a solvent had been put, and then into which a fine particle additive liquid was added. The resultant mixture was heated, and completely dissolved while being stirred, the resultant was filtered by using Azumi filter paper No. 244 manufactured by AZUMI FILTER PAPER CO., LTD, and a dope liquid was prepared.

<Composition of Main Dope Liquid 1>

| | |
|---|---|
| Methylene chloride | 370 parts by weight |
| Ethanol | 35 parts by weight |
| Cellulose acetate (the substitution degree of an acetyl group is 2.9, and the number average molecular weight is 75000) | 50 parts by weight |
| Ethyl cellulose (the ethoxyl substitution degree is 2.3, and the number average molecular weight is 61000) | 50 parts by weight |
| Fine particle dispersion liquid 1 | 1 part by weight |

The above-described dope liquid was charged into a main dissolving kettle that had been hermetically sealed, the resultant mixture was dissolved while being stirred, and a dope liquid was prepared.

The dope liquid prepared in the above was uniformly cast onto a stainless steel belt support, and a solvent was evaporated until the residual amount of the solvent in a film became 75% by mass. Next, the resultant film was released from the stainless steel belt support with a releasing force of 130 N/m. The released phase difference film was stretched 30% (1.3 times) in a width direction while being heated at 160° C. by using a tenter. The residual solvent at the time of starting the stretching was 15% by mass.

Next, drying was terminated while transporting the film with a large number of rolls in a drying zone. The drying temperature was set as 130° C., and the transporting tension was set as 100 N/m. As described above, an optical film having a dry film thickness of 30 μm was obtained.

Example 1

Except that addition amounts of cellulose acetate, and ethyl cellulose were changed to 55 parts by mass, and 45 parts by mass, respectively, an optical film was produced in the same manner as in Comparative Example 1.

Example 2

Except that addition amounts of cellulose acetate, and ethyl cellulose were changed to 60 parts by mass, and 40 parts by mass, respectively, an optical film was produced in the same manner as in Comparative Example 1.

Example 3

Except that addition amounts of cellulose acetate, and ethyl cellulose were changed to 65 parts by mass, and 35 parts by mass, respectively, an optical film was produced in the same manner as in Comparative Example 1.

Example 4

Except that addition amounts of cellulose acetate, and ethyl cellulose were changed to 80 parts by mass, and 20 parts by mass, respectively, an optical film was produced in the same manner as in Comparative Example 1.

Example 5

Except that addition amounts of cellulose acetate, and ethyl cellulose were changed to 95 parts by mass, and 5 parts by mass, respectively, an optical film was produced in the same manner as in Comparative Example 1.

Example 6

Except that addition amounts of cellulose acetate, and ethyl cellulose were changed to 99 parts by mass, and 1 part by mass, respectively, an optical film was produced in the same manner as in Comparative Example 1.

Comparative Example 2

Except that addition amount of cellulose acetate was set as 100 parts by mass, and ethyl cellulose was not added, an optical film was produced in the same manner as in Comparative Example 1.

Comparative Example 3

Except that a polyester-based plasticizer PE1 (15.0 parts by mass) was further added, an optical film was produced in the same manner as in Comparative Example 1. The composition of PE1 are as follows.

[Chemical formula 28]

| Dicarboxylic acid | | | | Diol | | | | |
|---|---|---|---|---|---|---|---|---|
| Aromatic dicarboxylic acid | Aliphatic dicarboxylic acid | Dicarboxylic acid ratio (% by mole) | Average carbon number of dicarboxylic acid | Aliphatic diol | Diol ratio (% by mole) | Average carbon number of aliphatic diol | End | Number average molecular weight |
| Terephthalic acid | Succinic acid | 50/50 | 6.0 | Ethanediol | 100 | 2.0 | Diol residue | 2200 |

Example 7

Except that addition amounts of cellulose acetate, and ethyl cellulose were changed to 55 parts by mass, and 45 part by mass, respectively, an optical film was produced in the same manner as in Comparative Example 3.

Example 8

Except that addition amounts of cellulose acetate, and ethyl cellulose were changed to 60 parts by mass, and 40 parts by mass, respectively, an optical film was produced in the same manner as in Comparative Example 3.

Example 9

Except that addition amounts of cellulose acetate, and ethyl cellulose were changed to 80 parts by mass, and 20 parts by mass, respectively, an optical film was produced in the same manner as in Comparative Example 3.

Example 10

Except that addition amounts of cellulose acetate, and ethyl cellulose were changed to 95 parts by mass, and 5 parts by mass, respectively, an optical film was produced in the same manner as in Comparative Example 3.

Example 11

Except that addition amounts of cellulose acetate, and ethyl cellulose were changed to 99 parts by mass, and 1 part by mass, respectively, an optical film was produced in the same manner as in Comparative Example 3.

Comparative Example 4

Except that addition amount of cellulose acetate was set as 100 parts by mass, and ethyl cellulose was not added, an optical film was produced in the same manner as in Comparative Example 3.

Example 12

Except that cellulose acetate (the substitution degree of an acetyl group is 2.4, and the number average molecular weight is 56000) was used in place of the cellulose acetate (the substitution degree of an acetyl group is 2.9), an optical film was produced in the same manner as in Example 9.

Example 13

Except that cellulose acetate (the substitution degree of an acetyl group is 2.0, and the number average molecular weight is 54000) was used in place of the cellulose acetate (the substitution degree of an acetyl group is 2.9), an optical film was produced in the same manner as in Example 9.

Comparative Example 5

Except that cellulose acetate (the substitution degree of an acetyl group is 1.8, and the number average molecular weight is 53000) was used in place of the cellulose acetate (the substitution degree of an acetyl group is 2.9), an optical film was produced in the same manner as in Example 9.

Example 14

Except that cellulose acetate propionate (the substitution degree of an acetyl group is 2.4, the substitution degree of a propionyl group is 0.5, the total substitution degree is 2.9, and the number average molecular weight is 76000) was used in place of the cellulose acetate (the substitution degree of an acetyl group is 2.9), an optical film was produced in the same manner as in Example 9.

Example 15

Except that cellulose acetate propionate (the substitution degree of an acetyl group is 2.0, the substitution degree of a propionyl group is 0.9, the total substitution degree is 2.9, and the number average molecular weight is 77000) was used in place of the cellulose acetate (the substitution degree of an acetyl group is 2.9), an optical film was produced in the same manner as in Example 9.

Example 16

Except that cellulose acetate propionate (the substitution degree of an acetyl group is 1.6, the substitution degree of a propionyl group is 1.3, the total substitution degree is 2.9, and the number average molecular weight is 78000) was used in place of the cellulose acetate (the substitution degree of an acetyl group is 2.9), an optical film was produced in the same manner as in Example 9.

Example 17

Except that cellulose acetate propionate (the substitution degree of an acetyl group is 1.3, the substitution degree of a propionyl group is 1.6, the total substitution degree is 2.9, and the number average molecular weight is 79000) was used in place of the cellulose acetate (the substitution degree of an acetyl group is 2.9), an optical film was produced in the same manner as in Example 9.

Comparative Example 6

Except that cellulose acetate propionate (the substitution degree of an acetyl group is 0.4, the substitution degree of a propionyl group is 2.5, the total substitution degree is 2.9, and the number average molecular weight is 80000) was used in place of the cellulose acetate (the substitution degree of an acetyl group is 2.9), an optical film was produced in the same manner as in Example 9.

Example 18

Except that cellulose acetate butyrate (the substitution degree of an acetyl group is 2.4, the substitution degree of a butyryl group is 0.5, the total substitution degree is 2.9, and the number average molecular weight is 76000) was used in place of the cellulose acetate (the substitution degree of an acetyl group is 2.9), an optical film was produced in the same manner as in Example 9.

Example 19

Except that the addition amount of a polyester-based plasticizer PE1 was changed to 1 part by mass, an optical film was produced in the same manner as in Example 9.

Example 20

Except that the addition amount of a polyester-based plasticizer PE1 was changed to 8 parts by mass, an optical film was produced in the same manner as in Example 9.

Example 21

Except that the addition amount of a polyester-based plasticizer PE1 was changed to 30 parts by mass, an optical film was produced in the same manner as in Example 9.

Example 22

Except that the addition amount of a polyester-based plasticizer PE1 was changed to 35 parts by mass, an optical film was produced in the same manner as in Example 9.

Example 23

Except that a sugar ester-based plasticizer GE1 (the compound number is FA-6) expressed in the following formula was used in place of the polyester-based plasticizer PE1, an optical film was produced in the same manner as in Example 9.

[Chemical formula 29]

FA-6

Structure with substituents $CH_2OR^1$, $OR^2$, $OR^3$, $OR^4$, $CH_2OR^5$, $OR^6$, $OR^7$, $CH_2OR^8$ $$R = -\overset{O}{\underset{\|}{C}}-C_6H_5$$

Average substitution degree: 5.5

Example 24

Except that a sugar ester-based plasticizer GE2 (the compound number is FA-7) expressed in the following formula was used in place of the polyester-based plasticizer PE1, an optical film was produced in the same manner as in Example 9.

[Chemical formula 30]

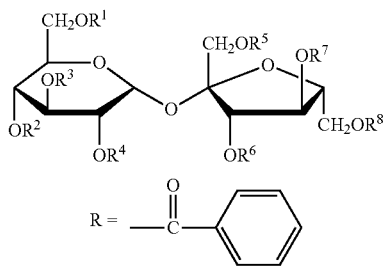

FA-7

Average substitution degree: 6.5

Example 25

Except that a sugar ester-based plasticizer GE3 (the compound number is FA-8) expressed in the following formula was used in place of the polyester-based plasticizer PE1, an optical film was produced in the same manner as in Example 9.

[Chemical formula 31]

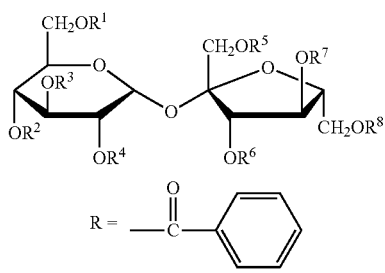

FA-8

Average substitution degree: 7.3

Example 26

Except that a polyester-based plasticizer PE2 expressed in the following was used in place of the polyester-based plasticizer PE1, an optical film was produced in the same manner as in Example 9.

251 g Of 1,2-propylene glycol, 354 g of terephthalic acid, 680 g of p-toluic acid, and 0.191 g of tetraisopropyl titanate as an esterification catalyst were charged into a four-neck flask of 2 liters equipped with a thermometer, a stirrer, and a slow and quick cooling pipe, and the resultant mixture was gradually heated up to 230° C. in a nitrogen gas flow while being stirred. A dehydration condensation reaction was performed while observing the polymerization degree. After the reaction, unreacted 1,2-propylene glycol was distilled off under reduced pressure at 200° C., and a plasticizer PE2 was obtained. The acid value was 0.30, and the number average molecular weight was 400.

Example 27

Except that a polyester-based plasticizer PE3 (the number average molecular weight is 400) expressed in the following formula was used in place of the polyester-based plasticizer PE1, an optical film was produced in the same manner as in Example 9.

[Chemical formula 32]

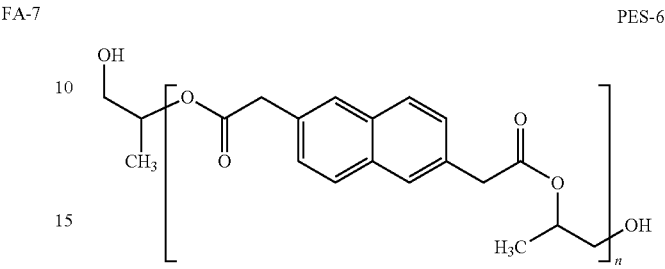

PES-6

Example 28

Except that a hydrogen bonded compound expressed in the following general formula was used in place of the polyester-based plasticizer PE1, an optical film was produced in the same manner as in Example 9.

[Chemical formula 33]

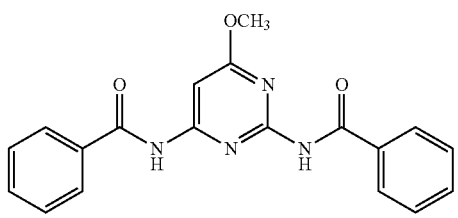

Example 29

Except that an acrylic copolymer (the weight average molecular weight is 8000), Ac1 of methyl methacrylate, and 2-hydroxyethyl methacrylate, which is an acrylic plasticizer, was used in place of the polyester-based plasticizer PE1, an optical film was produced in the same manner as in Example 9.

Example 30

Except that an acrylic copolymer (the weight average molecular weight is 12000), Ac2 of methyl methacrylate, and methyl acrylate, which is an acrylic plasticizer, was used in place of the polyester-based plasticizer PE1, an optical film was produced in the same manner as in Example 9.

Example 31

Except that SMA base resin SMA1000 (manufactured by Sartomer Co., Ltd.), St1, which is a styrene-based plasticizer, was used in place of the polyester-based plasticizer PE1, an optical film was produced in the same manner as in Example 9.

Example 32

Except that SMA base resin SMA2625 (manufactured by Sartomer Co., Ltd.), St2, which is a styrene-based plasticizer, was used in place of the polyester-based plasticizer PE1, an optical film was produced in the same manner as in Example 9.

Example 33

Except that a styrene/methyl methacrylate copolymer (the weight average molecular weight is 5000, and the composition ratio (mole ratio) is 50/50), St3, which is a styrene-based plasticizer, was used in place of the polyester-based plasticizer PE1, an optical film was produced in the same manner as in Example 9.

Example 34

Except that a styrene/hydroxystyrene copolymer 4 (the weight average molecular weight is 5000, and the composition ratio (mole ratio) is 50/50), St4, which is a styrene-based plasticizer, was used in place of the polyester-based plasticizer PE1, an optical film was produced in the same manner as in Example 9.

Example 35

Except that trimethylol propane tribenzoate, Poly-Al, which is a polyhydric alcohol ester-based plasticizer, was used in place of the polyester-based plasticizer PE1, an optical film was produced in the same manner as in Example 9.

Example 36

Except that 2,3-dinaphthalene dicarboxylic acid 1,3-butanediol, PE4 (the number average molecular weight is 400) was used in place of the polyester-based plasticizer PE1, an optical film was produced in the same manner as in Example 9.

<Performance Evaluation of Optical Film>

The optical films produced in Examples and Comparative Examples were subjected to performance evaluation.

(Retardation Rt and Ro)

A refractive index in a three-dimensional direction was measured at 10 points of an optical film. The average value (Ro) of in-plane retardation, and the average value (Rt) of retardation in a thickness direction, which are obtained in the following formulae (3) and (4), respectively, were determined.

[Mathematical formula 11]

$$Ro = (nx - ny) \times d \quad (3)$$

$$Rt = \{(nx+ny)/(2-nz)\} \times d \quad (4)$$

In the above formulae (3), and (4), nx is an in-plane refractive index of a film in a slow axis direction, ny is an in-plane refractive index of a film in a fast axis direction, nz is a refractive index of a film in a thickness direction, and d is a thickness (nm) of a film. Herein, the values of nx, ny, and nz were values obtained by a measurement at a wavelength of 590 nm under the conditions of 23° C. and 55% RH by using an automatic birefringence meter KOBRA-21ADH (manufactured by Oji Sceientific Instruments). Further, the value of d is a value obtained by using a micrometer.

(Rt Humidity Fluctuation)

The optical film was left to stand for 5 hours under the environments of 23° C. and 20% RH, and Rt ($Rt_1$) was measured under the same environments by the above-described method. Next, the optical film was left to stand for 5 hours under the environments of 23° C. and 80% RH, and Rt ($Rt_2$) was measured under the same environments by the above-described method. Then, the film was left to stand for 5 hours under the environments of 23° C. and 55% RH, and Rt ($Rt_3$) was measured under the same environments by the above-described method. At this moment, it was confirmed that the fluctuation due to humidity was reversible fluctuation.

From the measurement values of $Rt_1$, $Rt_2$, and $Rt_3$, a value of Rt humidity fluctuation was calculated by the following formula (6). Further, the smaller the value of Rt humidity fluctuation is, the more stable for the humidity fluctuation the film is.

[Mathematical formula 12]

$$Rt \text{ Humidity fluctuation} = |Rt_1 - Rt_2|/Rt_3 \times 100 \quad (6)$$

(Measurement of Tear Strength)

The tear load of an Elmendorf method was measured by a light load tear device manufactured by TOYO SEIKI Co., Ltd. in accordance with JIS K 7128-1991. The measurement of the tear load was performed under the conditions of 23° C. and 55% RH, in a case where a film is teared in the transportation direction (MD direction) of the film, and in a case where a film is teared in the direction perpendicular to the transportation direction (TD direction) of the film, respectively.

The obtained results are shown in the following Tables 1 to 6.

TABLE 1

| | Cellulose ester | | | | Cellulose ether | Performance evaluation | | | | |
|---|---|---|---|---|---|---|---|---|---|---|
| | X | Y | | | | | | | Tear | |
| | Substitution | | Substitution | X + | Amount (parts by | Amount (parts by | Ro | Rt | Rt Humidity fluctuation | strength (Nm) | |
| | degree | Kind | degree | Y | mass) | mass) | (nm) | (nm) | (%) | MD | TD |
| Comparative Example 1 | 2.9 | None | 0.0 | 2.9 | 50 | 50 | 135 | 310 | 5 | 33 | 29 |
| Example 1 | 2.9 | None | 0.0 | 2.9 | 55 | 45 | 100 | 260 | 6 | 48 | 43 |
| Example 2 | 2.9 | None | 0.0 | 2.9 | 60 | 40 | 70 | 210 | 7 | 55 | 50 |
| Example 3 | 2.9 | None | 0.0 | 2.9 | 65 | 35 | 60 | 180 | 8 | 60 | 55 |

TABLE 1-continued

|  | Cellulose ester | | | | Cellulose ether | Performance evaluation | | | Tear strength (Nm) | |
|---|---|---|---|---|---|---|---|---|---|---|
|  | X Substitution degree | Y Kind | Y Substitution degree | X + Y | Amount (parts by mass) | Amount (parts by mass) | Ro (nm) | Rt (nm) | Rt Humidity fluctuation (%) | MD | TD |
| Example 4 | 2.9 | None | 0.0 | 2.9 | 80 | 20 | 51 | 126 | 10 | 70 | 66 |
| Example 5 | 2.9 | None | 0.0 | 2.9 | 95 | 5 | 35 | 110 | 12 | 75 | 68 |
| Example 6 | 2.9 | None | 0.0 | 2.9 | 99 | 1 | 20 | 100 | 15 | 77 | 69 |
| Comparative Example 2 | 2.9 | None | 0.0 | 2.9 | 100 | 0 | 10 | 50 | 18 | 77 | 69 |

TABLE 2

|  | Cellulose ester | | | | Cellulose ether | Plasticizer | | Performance evaluation | | | Tear strength (Nm) | |
|---|---|---|---|---|---|---|---|---|---|---|---|---|
|  | X Substitution degree | Y Kind | Y Substitution degree | X + Y | Amount (parts by mass) | Amount (parts by mass) | Kind | Amount (parts by mass) | Ro (nm) | Rt (nm) | Rt Humidity fluctuation (%) | MD | TD |
| Comparative Example 3 | 2.9 | None | 0.0 | 2.9 | 50 | 50 | PE1 | 15 | 135 | 310 | 3 | 38 | 34 |
| Example 7 | 2.9 | None | 0.0 | 2.9 | 55 | 45 | PE1 | 15 | 100 | 260 | 4 | 53 | 48 |
| Example 8 | 2.9 | None | 0.0 | 2.9 | 60 | 40 | PE1 | 15 | 70 | 210 | 5 | 60 | 55 |
| Example 9 | 2.9 | None | 0.0 | 2.9 | 80 | 20 | PE1 | 15 | 51 | 126 | 8 | 75 | 71 |
| Example 4 | 2.9 | None | 0.0 | 2.9 | 80 | 20 | — | — | 51 | 126 | 10 | 70 | 66 |
| Example 10 | 2.9 | None | 0.0 | 2.9 | 95 | 5 | PE1 | 15 | 35 | 110 | 10 | 80 | 73 |
| Example 11 | 2.9 | None | 0.0 | 2.9 | 99 | 1 | PE1 | 15 | 20 | 100 | 13 | 82 | 74 |
| Comparative Example 4 | 2.9 | None | 0.0 | 2.9 | 100 | 0 | PE1 | 15 | 10 | 50 | 16 | 82 | 74 |

* PE: Polyester compound

TABLE 3

|  | Cellulose ester | | | | Cellulose ether | Plasticizer | | Performance evaluation | | | Tear strength (Nm) | |
|---|---|---|---|---|---|---|---|---|---|---|---|---|
|  | X Substitution degree | Y Kind | Y Substitution degree | X + Y | Amount (parts by mass) | Amount (parts by mass) | Kind | Amount (parts by mass) | Ro (nm) | Rt (nm) | Rt Humidity fluctuation (%) | MD | TD |
| Example 9 | 2.9 | None | 0 | 2.9 | 80 | 20 | PE1 | 15 | 51 | 126 | 8 | 81 | 72 |
| Example 12 | 2.4 | None | 0 | 2.4 | 80 | 20 | PE1 | 15 | 60 | 135 | 5 | 76 | 70 |
| Example 13 | 2 | None | 0 | 2 | 80 | 20 | PE1 | 15 | 65 | 160 | 4 | 58 | 53 |
| Comparative Example 5 | 1.8 | None | 0 | 1.8 | 80 | 20 | PE1 | 15 | 135 | 310 | 4 | 34 | 31 |

* PE: Polyester compound

TABLE 4

| | Cellulose ester | | | | Cellulose ether | Plasticizer | | Performance evaluation | | | Tear strength (Nm) | |
|---|---|---|---|---|---|---|---|---|---|---|---|---|
| | X Substitution degree | Y Kind | Y Substitution degree | X + Y | Amount (parts by mass) | Amount (parts by mass) | Kind | Amount (parts by mass) | Ro (nm) | Rt (nm) | Rt Humidity fluctuation (%) | MD | TD |
| Example 9 | 2.9 | None | 0 | 2.9 | 80 | 20 | PE1 | 15 | 45 | 120 | 9 | 81 | 72 |
| Example 14 | 2.4 | Propionyl group | 0.5 | 2.9 | 80 | 20 | PE1 | 15 | 45 | 120 | 9 | 82 | 74 |
| Example 15 | 2.0 | Propionyl group | 0.9 | 2.9 | 80 | 20 | PE1 | 15 | 45 | 120 | 9 | 79 | 73 |
| Example 16 | 1.6 | Propionyl group | 1.3 | 2.9 | 80 | 20 | PE1 | 15 | 45 | 120 | 10 | 78 | 72 |
| Example 17 | 1.3 | Propionyl group | 1.6 | 2.9 | 80 | 20 | PE1 | 15 | 45 | 120 | 12 | 80 | 73 |
| Comparative Example 6 | 0.4 | Propionyl group | 2.5 | 2.9 | 80 | 20 | PE1 | 15 | 45 | 120 | 16 | 78 | 72 |
| Example 18 | 2.4 | Butyryl group | 0.5 | 2.9 | 80 | 20 | PE1 | 15 | 45 | 120 | 9 | 82 | 74 |

* PE: Polyester compound

TABLE 5

| | Cellulose ester | | | | Cellulose ether | Plasticizer | | Performance evaluation | | | Tear strength (Nm) | |
|---|---|---|---|---|---|---|---|---|---|---|---|---|
| | X Substitution degree | Y Kind | Y Substitution degree | X + Y | Amount (parts by mass) | Amount (parts by mass) | Kind | Amount (parts by mass) | Ro (nm) | Rt (nm) | Rt Humidity fluctuation (%) | MD | TD |
| Example 4 | 2.9 | None | 0 | 2.9 | 80 | 20 | — | — | 51 | 126 | 10 | 76 | 70 |
| Example 19 | 2.9 | None | 0 | 2.9 | 80 | 20 | PE1 | 1 | 51 | 126 | 9 | 78 | 72 |
| Example 20 | 2.9 | None | 0 | 2.9 | 80 | 20 | PE1 | 8 | 51 | 126 | 8 | 81 | 72 |
| Example 9 | 2.9 | None | 0 | 2.9 | 80 | 20 | PE1 | 15 | 51 | 126 | 8 | 80 | 73 |
| Example 21 | 2.9 | None | 0 | 2.9 | 80 | 20 | PE1 | 30 | 45 | 118 | 8 | 58 | 53 |
| Example 22 | 2.9 | None | 0 | 2.9 | 80 | 20 | PE1 | 35 | 38 | 110 | 8 | 43 | 37 |

* PE: Polyester compound

TABLE 6

| | Cellulose ester | | | | Cellulose ether | Plasticizer | | Other plasticizers | | Performance evaluation | | | Tear strength (Nm) | |
|---|---|---|---|---|---|---|---|---|---|---|---|---|---|---|
| | X Substitution degree | Y Kind | Y Substitution degree | X + Y | Amount (parts by mass) | Amount (parts by mass) | Kind | Amount (parts by mass) | Kind | Amount (parts by mass) | Ro (nm) | Rt (nm) | Rt Humidity fluctuation (%) | MD | TD |
| Example 9 | 2.9 | None | 0 | 2.9 | 80 | 20 | PE1 | 15 | — | — | 51 | 126 | 8 | 81 | 72 |
| Example 23 | 2.9 | None | 0 | 2.9 | 80 | 20 | GE1 | 15 | — | — | 51 | 126 | 7 | 76 | 70 |
| Example 24 | 2.9 | None | 0 | 2.9 | 80 | 20 | GE2 | 15 | — | — | 51 | 126 | 7 | 78 | 72 |
| Example 25 | 2.9 | None | 0 | 2.9 | 80 | 20 | GE3 | 15 | — | — | 51 | 126 | 7 | 81 | 72 |
| Example 26 | 2.9 | None | 0 | 2.9 | 80 | 20 | PE2 | 15 | — | — | 51 | 126 | 7 | 80 | 73 |
| Example 27 | 2.9 | None | 0 | 2.9 | 80 | 20 | PE3 | 15 | — | — | 51 | 126 | 7 | 81 | 72 |
| Example 28 | 2.9 | None | 0 | 2.9 | 80 | 20 | — | — | Hydrogen bond compound | 15.0 | 51 | 126 | 7 | 82 | 74 |
| Example 29 | 2.9 | None | 0 | 2.9 | 80 | 20 | Ac1 | 15 | — | — | 45 | 115 | 7 | 79 | 73 |
| Example 30 | 2.9 | None | 0 | 2.9 | 80 | 20 | Ac2 | 15 | — | — | 45 | 115 | 7 | 78 | 72 |
| Example 31 | 2.9 | None | 0 | 2.9 | 80 | 20 | St1 | 15 | — | — | 45 | 115 | 7 | 80 | 73 |
| Example 32 | 2.9 | None | 0 | 2.9 | 80 | 20 | St2 | 15 | — | — | 45 | 115 | 7 | 78 | 72 |
| Example 33 | 2.9 | None | 0 | 2.9 | 80 | 20 | St3 | 15 | — | — | 45 | 115 | 7 | 82 | 74 |
| Example 34 | 2.9 | None | 0 | 2.9 | 80 | 20 | St4 | 15 | — | — | 45 | 115 | 7 | 82 | 74 |

TABLE 6-continued

| | Cellulose ester | | | | Cellulose ether | Plasticizer | | Other plasticizers | | Performance evaluation | | | | |
|---|---|---|---|---|---|---|---|---|---|---|---|---|---|---|
| | X Substitution degree | Y Kind | Y Substitution degree | X + Y | Amount (parts by mass) | Amount (parts by mass) | Kind | Amount (parts by mass) | Kind | Amount (parts by mass) | Ro (nm) | Rt (nm) | Rt Humidity fluctuation (%) | Tear strength (Nm) MD | TD |
| Example 35 | 2.9 | None | 0 | 2.9 | 80 | 20 | Poly-Al | 15 | — | — | 51 | 126 | 9 | 79 | 73 |
| Example 36 | 2.9 | None | 0 | 2.9 | 80 | 20 | PE4 | 15 | — | — | 51 | 126 | 7 | 78 | 72 |

*PE: Polyester compound
GE: Sugar ester compound
Ac: Acrylic compound
St: Styrene-based compound
Poly-Al: Polyhydric alcohol-based plasticizer From the results of Table 1, it was found that in a case where cellulose ester according to the present invention is used, when cellulose ether is mixed in a predetermined amount to obtain an optical film, an optical film in which a phase difference suitable for a VA type liquid crystal display is obtained, and further, the value of Rt humidity fluctuation is low, and the water resistance is high, can be obtained. On the other hand, from the results of Comparative Example 1, it was found that when the mixed amount of cellulose ether is large, the value of the Rt humidity fluctuation becomes low, however, an excessively high value of the phase difference is shown. Further, from the results of Comparative Example 2, it was found that in a case where cellulose ester according to the present invention is only used, the intended phase difference cannot be obtained, and a high value of the Rt humidity fluctuation is shown.

From the results of Tables 2 to 6, it was found that cellulose ester having a specific structure according to the present invention is excellent in water resistance while achieving the intended phase difference. Further, for example, from the results of Example 9 and Example 4 in Table 2, it was found that there is a tendency that when a plasticizer is added, the value of the Rt humidity fluctuation can be decreased. Furthermore, from the results of Table 4, it was found that there is a tendency that the value of the Rt humidity fluctuation can be decreased even if the acetyl group is changed to a propionyl group or a butyryl group. In addition, from the results of Tables 5 and 6, it was found that the amount or kind of a plasticizer influences on the values of the phase difference or the Rt humidity fluctuation.

The ethyl cellulose of Example 9 was replaced with methyl cellulose, and butyl cellulose, and the experiment was performed. The phase difference, the Rt humidity fluctuation, and the tear strength similarly had favorable results.

Next, a polarizing plate and a liquid crystal display were prepared by using an optical film produced in Examples and Comparative Examples, and were subjected to evaluation.

Production Example 1

Preparation of Polarizing Plate

<Active Energy Ray Curable Adhesive: Use of Cationic Polymerization Type Adhesive (in Table, Described as Cationic Polymerization Type)>
Preparation of Cationic Polymerization Type Adhesive Each of the following components was mixed, then the resultant mixture was degassed, and an active energy ray curable adhesive was prepared. Further, the triaryl sulfonium hexafluorophosphate was mixed as a 50% propylene carbonate solution. In the following, the solid component amount of the triaryl sulfonium hexafluorophosphate has been indicated.

| | |
|---|---|
| 3,4-Epoxycyclohexylmethyl-3,4-epoxycyclohexanecarboxylate | 45 parts by weight |
| Epolead GT-301 (alicyclic epoxy resin manufactured by Daicel Corporation) | 40 parts by weight |
| 1,4-Butanediol diglycidyl ether | 15 parts by weight |
| Triaryl sulfonium hexafluorophosphate | 2.3 parts by weight |
| 9,10-Dibutoxyanthracene | 0.1 part by weight |
| 1,4-Diethoxynaphthalene | 2.0 parts by weight |

Preparation of Polarizer

A polyvinyl alcohol film having a thickness of 30 μm was swollen with water of 35° C. The obtained film was immersed for 60 seconds in an aqueous solution composed of 0.075 g of iodine, 5 g of potassium iodide, and 100 g of water. Next, the resultant was immersed in an aqueous solution of 45° C. composed of 3 g of potassium iodide, 7.5 g of boric acid, and 100 g of water. The obtained film was uniaxially stretched under the conditions of a stretching temperature of 55° C., and a stretch ratio of 5 times. The uniaxially stretched film was washed with water, then dried, and a polarizer having a thickness of 10 μm was obtained.

Preparation of Polarizing Plate

According to the following method, a polarizing plate having a constitution of a polarizing plate 101A in FIG. 2 was prepared. A numerical value in parentheses indicates the number of each of the constituent elements described in FIG. 2.

As the protective film (102), a KC6UA film (manufactured by KONICA MINOLTA, INC.) was prepared. An active energy ray curable adhesive prepared in the above was applied on the KC6UA film by using a microgravure coater (gravure roller: #300, rotational speed 140%/line speed) so that the thickness is 5 μm, and a cationic polymerization type adhesive (103A) was formed.

Next, onto an optical film (105) of Example 9, the cationic polymerization type adhesive prepared in the above was applied in the same manner as in the above so that the thickness is 5 μm, and a cationic polymerization type adhesive (103B) was formed.

The polyvinyl alcohol-iodine-based polarizer (104) prepared in the above was arranged between the cationic polymerization type adhesives (103A) and (103B), and bonded by a roller machine. A laminate laminated as a protective film 1 (102)/a cationic polymerization type adhesive (103A)/a polarizer (104)/a cationic polymerization type adhesive (103B)/an optical film (105) was obtained. At this moment, the bonding was performed by a roller machine so that the slow axis of an optical film (105) and the absorption axis of a polarizer (104) are perpendicular to each other.

The laminate was irradiated from both sides thereof with an electron beam to prepare a polarizing plate (101A). Further, the line speed was set as 20 m/min, the acceleration voltage was set as 250 kV, and the irradiation dose was set as 20 kGy.

(Preparation of Liquid Crystal Display)

By using a VA type liquid crystal display (40-inch display KLV-40 J3000, manufactured by Sony Corporation), polarizing plates bonded on both surfaces of a liquid crystal cell were released, and the polarizing plates prepared in the above were bonded on each of both surfaces of a liquid crystal cell, respectively, as shown in FIG. 2, and a liquid crystal display was prepared. At this moment, the direction of the absorption axis of a polarizing plate was adjusted to the same direction as that of a polarizing plate that had been bonded in advance.

Production Examples 2 to 5

Using the optical films produced in Examples 12, 23, and 28, and Comparative Example 6, a polarizing plate and a liquid crystal display were prepared in the same manner as in Production Example 1.

Production Example 6

Preparation of Polarizing Plate

<Active Energy Ray Curable Adhesive: Use of Radical Polymerization Type Adhesive (in Table, Described as Radical Polymerization Type)>

The one obtained by the mixture of 3 parts by mass of a photoinitiator (trade name Irgacure 127 manufactured by BASF Japan Ltd.) into 100 parts by mass of N-hydroxyethyl acrylamide was used as a photocurable adhesive liquid R.

In accordance with the following method, a polarizing plate having a constitution of polarizing plate 101A in FIG. 2 was prepared. A numerical value in parentheses indicate the number of each of the constituent elements described in FIG. 2.

As the optical film (105), an optical film produced in Example 9 was used. The radical polymerization type adhesive liquid prepared in the above was applied on the optical film by using a microgravure coater (gravure roller: #300, rotational speed 140%/line speed) so that the thickness is 5 μm, and a photocurable type resin layer (103B) was formed.

Next, as the protective film (102), A Konica Minolta TAC KC4UY film (manufactured by KONICA MINOLTA, INC.) was used. The radical polymerization type adhesive liquid prepared in the above was applied on the film in the same manner as in the above so that the thickness is 5 μm, and a photocurable type resin layer (103A) was formed.

The polyvinyl alcohol-iodine-based polarizer (104) prepared in Production Example 1 was arranged between the photocurable type resin layers (103A) and (103B), and bonded by a roller machine. A laminate laminated as a protective film (102)/a photocurable type resin layer (103A)/a polarizer (104)/a photocurable type resin layer (103B)/an optical film (105) was obtained. At this moment, the bonding was performed by a roller machine so that the slow axis of an optical film (105) and the absorption axis of a polarizer (104) are perpendicular to each other. The laminate was irradiated from both sides thereof with an electron beam under the conditions of a line speed of 20 m/min, an acceleration voltage of 250 kV, and an irradiation dose of 20 kGy to prepare a polarizing plate (101A).

(Preparation of Liquid Crystal Display)

A liquid crystal display was prepared in the same manner as in Production Example 1.

Production Examples 7 to 10

By using the optical films produced in Examples 12, 23, and 28, and Comparative Example 6, a liquid crystal display was prepared in the same manner as in Production Example 6.

Production Example 11

Preparation of Polarizing Plate

By using a polyvinyl alcohol adhesive as the adhesive, a polarizing plate was prepared. (In Table, described as polyvinyl alcohol)

(Preparation of Polarizer)

A polyvinyl alcohol film having an average thickness of 52 μm, and a moisture content of 4.4% was continuously subjected to preliminary swelling, staining, uniaxial stretching by a wet method, a fixing treatment, drying, and a heat treatment in this order, and a polarizing plate was prepared.

Specifically, a PVA (polyvinyl alcohol) film was immersed in water at a temperature of 30° C. for 30 seconds to be preliminary swollen. The PVA film was immersed for 3 minutes in an aqueous solution of 35° C. containing iodine, and potassium iodide at concentrations of 0.4 g/L, and 40 g/L, respectively to be swollen. Next, the PVA film was uniaxially stretched to 6 times under the condition that the tension applied to the film in an aqueous solution of 50° C. having a boric acid concentration of 4% by mass is 700 N/. Next, the PVA film was immersed for 5 minutes in an aqueous solution of 30° C. containing potassium iodide, boric acid, and zinc chloride at concentrations of 40 g/L, 40 g/L, and 10 g/L, respectively, and was subjected to a fixing treatment. After that, the PVA film was taken out, dried with hot air of 40° C., and further subjected to a heat treatment at a temperature of 100° C. for 5 minutes. The average thickness of the obtained polarizer was 25 μm. In addition, as to the polarization performance, the transmittance was 43.0%, the polarization degree was 99.5%, and the dichroic ratio was 40.1.

(Bonding)

In accordance with the following steps a to d, on a polarizer, an optical film produced in Example 9 as the optical film, and a Konica Minolta TAC KC6UA film (manufactured by KONICA MINOLTA, INC.) that is a triacetyl cellulose film, as the protective film, were bonded.

Step a

The polarizer prepared in the above was immersed for 1 to 2 seconds in a storage tank of a polyvinyl alcohol adhesive solution having a solid content of 2% by mass.

Step b

A KC6UA film as the protective film, and an optical film of Example 9 were immersed at 50° C. for 45 seconds in an aqueous solution of 1.5 mol/L KOH, and subjected to an alkali saponification treatment, then immersed and washed in water at 30° C. for 60 seconds. Next, a 10% by mass aqueous solution of HCl was immersed at 30° C. for 45 seconds, and subjected to neutralization, then immersed and washed in water at 30° C. for 60 seconds. After that, the film was dried at 100° C.

The excessive adhesive adhere to the polarizer immersed in a polyvinyl alcohol adhesive solution in step a is removed loosely, and this polarizer was sandwiched between a KC4UY film and the above-described optical film 105, and laminated and arranged. That is, a laminate laminated as a protective film 102/a polyvinyl alcohol adhesive (103A)/a polarizer (104)/a polyvinyl alcohol adhesive (103B)/an optical film (105), which has a constitution of a polarizing plate 101A in FIG. 2, was obtained.

Step c

The laminate was bonded by two rotating rollers at a speed of around 2 m/min under a pressure of 20 to 30 N/cm². At this moment, the bonding was performed with care so as to keep out air bubbles.

Step d

The sample prepared in the above Step c was subjected to a drying treatment for 5 minutes in a dryer at 80° C., and a polarizing plate having a constitution of a polarizing plate 101A in FIG. 2 was prepared.

(Preparation of Liquid Crystal Display)

A liquid crystal display was prepared in the same manner as in Production Example 1.

Production Examples 12 to 15

By using the optical films produced in Examples 12, 23, and 28, and Comparative Example 6, a liquid crystal display was prepared in the same manner as in Production Example 11.

<Performance Evaluation of Liquid Crystal Display>

The liquid crystal display produced in Production Examples 1 to 15 was subjected to performance evaluation.

(L* of Water-Immersed Part/L* of Non-Immersed Part)

A liquid crystal display was laid and placed on a pedestal and the like, and then BEMCOT (manufactured by Asahi Kasei Corporation) was placed on part of the polarizing plate for evaluation, and soaked in water. BEMCOT was covered with 100 μm PET so as not to be dried, signals of black display were input from a PC to a television, and the television was left for 24 hours in the power-on state (at a room temperature of 23° C., and a panel temperature of 38° C.). After 24 hours, BEMCOT was removed. L* of the part where the BEMCOT had been placed was measured as L* of the water-immersed part by EZContrast (manufactured by ELDIM). L* of the part where the BEMCOT had not been placed was measured as L* of the non-immersed part by EZContrast. Further, the measurement by EZContrast was performed in a color mode while the television was in the black display. The water immersion was left to stand for 24 hours under the water immersion conditions of the power-on state of the panel, and the sticking state of the BEMCOT sufficiently soaked in water. The L* of water-immersed part/L* of non-immersed part was calculated by dividing the obtained L* of water-immersed part by L* of non-immersed part.

The obtained results are shown in the following Table 7.

TABLE 7

| | Optical film | Adhesive | Color unevenness |
|---|---|---|---|
| Production Example 1 | Example 9 | Cationic polymerization type | 1.49 |
| Production Example 2 | Example 12 | Cationic polymerization type | 1.3 |
| Production Example 3 | Example 23 | Cationic polymerization type | 1.43 |
| Production Example 4 | Example 28 | Cationic polymerization type | 1.43 |
| Production Example 5 | Example 6 | Cationic polymerization type | 1.99 |
| Production Example 6 | Example 9 | Radical polymerization type | 1.49 |
| Production Example 7 | Example 12 | Radical polymerization type | 1.3 |
| Production Example 8 | Example 23 | Radical polymerization type | 1.43 |
| Production Example 9 | Example 28 | Radical polymerization type | 1.43 |
| Production Example 10 | Example 6 | Radical polymerization type | 1.99 |
| Production Example 11 | Example 9 | Polyvinyl alcohol | 1.64 |
| Production Example 12 | Example 12 | Polyvinyl alcohol | 1.45 |
| Production Example 13 | Example 23 | Polyvinyl alcohol | 1.58 |
| Production Example 14 | Example 28 | Polyvinyl alcohol | 1.58 |
| Production Example 15 | Comparative Example 6 | Polyvinyl alcohol | 2.14 |

From the results of Table 7, it was found that in the liquid crystal display using the optical film according to the present invention, the color unevenness is hardly generated because the optical film has water resistance.

The present application is based on the Japanese Patent Application No. 2013-045882 filed on Mar. 7, 2013, and the disclosed content thereof is referred to, and incorporated as a whole.

REFERENCE SIGNS LIST

1 Dissolving kettle,
3, 6, 12, and 15 Filter,
4, and 13 Stock tank,
2, 5, 11, and 14 Liquid feeding pump,
8, and 16 Conduit,
10 UV absorber feeding kettle,
20 Junction pipe,
21 Mixer,
30 Die,
31 Metal support,
32 Web,
33 Release position,
34 Tenter device,
35 Roller drying device,
41 Feeding kettle,
42 Stock kettle,
43 Pump,
44 Filter,
101A, and 101B Polarizing plate,
102 Protective film,
103A, and 103B Active energy ray curable adhesive,
104 Polarizer,
105 Phase difference film,
106 Functional layer,
107 Liquid crystal cell, and
108 Liquid crystal display.

The invention claimed is:

1. An optical film, comprising cellulose ester and cellulose ether, wherein
the cellulose ester satisfies formulae (1), and (2):
[Mathematical formula 1]

$$2.0 \leq X+Y \leq 3.0 \quad (1)$$

$$0 \leq Y \leq 1.6 \quad (2)$$

wherein X is a substitution degree of an acetyl group, and Y is a substitution degree of a propionyl group, a butyryl group, or the propionyl group and the butyryl group;
a mixing ratio of the cellulose ester and the cellulose ether (cellulose ester:cellulose ether) is 99.0:1.0 to 55.0:45.0 mass ratio; and
retardations Ro, and retardation Rt expressed in formulae (3), and (4):
[Mathematical formula 2]

$$Ro=(nx-ny) \times d \quad (3)$$

$$Rt=\{(nx+ny)/(2-nz)\} \times d \quad (4)$$

wherein nx is an in-plane refractive index of a film in a slow axis direction, ny is an in-plane refractive index of a film in a fast axis direction, nz is a refractive index of a film in a thickness direction, and d is a thickness nm of a film,
are 20 to 130 nm, and 100 to 300 nm, respectively.

2. The optical film according to claim 1,
wherein the mixing ratio of the cellulose ester and the cellulose ether (cellulose ester:cellulose ether) is 95.0:5.0 to 60.0:40.0 mass ratio.

3. The optical film according to claim 1,
wherein the cellulose ester satisfies formula (5):
[Mathematical formula 3]

$$0 \leq Y \leq 0.9 \quad (5).$$

4. The optical film according to claim 1, further comprising
1.0 to 30.0 parts by mass of a plasticizer based on 100 parts by mass in total of cellulose ester and cellulose ether.

5. The optical film according to claim 4,
wherein the plasticizer is at least one selected from the group consisting of a carbohydrate derivative, a polyester compound, and a resin having a negative birefringence.

6. The optical film according to claim 1, further comprising
a hydrogen bonded compound.

7. A polarizing plate, comprising
the optical film according to claim 1, and a polarizer,
wherein the optical film and the polarizer are bonded by an active energy ray curable adhesive.

8. A vertical alignment (VA) type liquid crystal display,
wherein the polarizing plate according to claim 7 is provided at least on one surface of a liquid crystal cell.

* * * * *